United States Patent
Zhang et al.

(10) Patent No.: US 12,033,592 B2
(45) Date of Patent: Jul. 9, 2024

(54) METHOD AND APPARATUS FOR DISPLAYING IMAGE AND SCREEN DRIVING BOARD

(71) Applicants: Beijing BOE Optoelectronics Technology Co., Ltd., Beijing (CN); BOE Technology Group Co., Ltd., Beijing (CN)

(72) Inventors: Shuo Zhang, Beijing (CN); Tiankuo Shi, Beijing (CN); Xiaomang Zhang, Beijing (CN); Yanhui Xi, Beijing (CN); Zhihua Ji, Beijing (CN); Yan Sun, Beijing (CN); Chenxi Zhao, Beijing (CN); Xiangjun Peng, Beijing (CN); Yifan Hou, Beijing (CN); Minglei Chu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/630,721

(22) PCT Filed: Dec. 24, 2020

(86) PCT No.: PCT/CN2020/139075
§ 371 (c)(1),
(2) Date: Jun. 30, 2022

(87) PCT Pub. No.: WO2022/133920
PCT Pub. Date: Jun. 30, 2022

(65) Prior Publication Data
US 2023/0377526 A1 Nov. 23, 2023

(51) Int. Cl.
G09G 3/34 (2006.01)
G09G 3/36 (2006.01)
G09G 5/391 (2006.01)

(52) U.S. Cl.
CPC ......... G09G 3/3426 (2013.01); G09G 3/3406 (2013.01); G09G 3/342 (2013.01);
(Continued)

(58) Field of Classification Search
CPC ....... G09G 2360/16; G09G 2320/0626; G09G 3/3426; G09G 2320/0646;
(Continued)

(56) References Cited

U.S. PATENT DOCUMENTS 9,135,864 B2 * 9/2015 Shields ................. G02F 1/1333
10,600,377 B2 * 3/2020 Zha ....................... G09G 3/3406
(Continued)

Primary Examiner — Dismery Mercedes
(74) Attorney, Agent, or Firm — LIPPES MATHIAS LLP

(57) ABSTRACT

Provided is a method for displaying an image, including acquiring a first target image with a third resolution and a second target image with a fourth resolution; determining a reference grayscale value of each of the backlight sections based on grayscale values of respective pixels in the first image region corresponding to the backlight section; determining grayscale values of respective pixels in a first display image based on grayscale values of respective pixels in the first target image; determining grayscale values of respective pixels in a second display image; driving each of the backlight sources to emit light based on the reference grayscale value of the backlight section where the backlight source is disposed; driving the first display panel to perform display based on the first display image; and driving the second display panel to perform display based on the second display image.

19 Claims, 14 Drawing Sheets

(52) U.S. Cl.
CPC .......... *G09G 3/3607* (2013.01); *G09G 5/391* (2013.01); *G09G 2300/023* (2013.01); *G09G 2320/0626* (2013.01); *G09G 2320/0686* (2013.01); *G09G 2340/0407* (2013.01); *G09G 2340/0428* (2013.01)

(58) Field of Classification Search
CPC .......... G09G 2320/066; G09G 3/3406; G09G 3/342; G09G 2320/0686; G09G 2340/0407; G09G 2340/0428; G09G 2320/0673; G09G 3/3607; G09G 3/2003; G09G 2300/023; G09G 5/391; G09G 3/2007; G09G 5/10; G06F 3/147
See application file for complete search history.

(56) References Cited

U.S. PATENT DOCUMENTS

| | | | | |
|---|---|---|---|---|
| 10,613,377 | B2* | 4/2020 | Shih | G09G 3/3426 |
| 10,872,558 | B2* | 12/2020 | Ji | G09G 3/32 |
| 10,991,325 | B2* | 4/2021 | Lin | G09G 3/3426 |
| 11,488,559 | B2* | 11/2022 | Chen | G02F 1/13306 |
| 2008/0273005 | A1* | 11/2008 | Chen | G09G 3/3426 |
| | | | | 345/102 |
| 2009/0096710 | A1* | 4/2009 | Raman | G09G 3/3426 |
| | | | | 345/1.1 |
| 2017/0110064 | A1* | 4/2017 | Zhang | G09G 3/3406 |
| 2019/0355330 | A1* | 11/2019 | Lin | G09G 5/026 |

* cited by examiner

|   | 1 | 2 | 3 | 4 | 5 | 6 |
|---|---|---|---|---|---|---|
| 1 | Upper left | Upper | Upper | Upper right | Upper right | Upper right |
| 2 | Upper left | Upper | Upper | Upper right | Upper right | Upper right |
| 3 | Upper left | Upper | Upper | Upper right | Upper right | Upper right |
| 4 | Upper left | Upper | Upper | Upper right | Upper right | Upper right |
| 5 | Left | — | — | Right | Right | Right |
| 6 | Left | — | — | Right | Right | Right |

Adding a plurality of fifth supplementing pixels to a side, distal from the center, of at least one row edge in a third display image, based on positions of effective pixels of a first display panel — 3131

Adding a plurality of sixth supplementing pixels to a side, distal from the center, of at least one column edge in the third display image based on the positions of the effective pixels of the first display panel — 3132

FIG. 15

METHOD AND APPARATUS FOR DISPLAYING IMAGE AND SCREEN DRIVING BOARD

CROSS-REFERENCE TO RELATED APPLICATIONS

This application is a 371 of PCT Application No. PCT/CN2020/139075, filed on Dec. 24, 2020, the disclosure of which is herein incorporated by reference in its entirety.

TECHNICAL FIELD

The present disclosure relates to the field of image processing technologies, and in particular, relates to a method and apparatus for displaying an image and a screen driving board.

BACKGROUND

With the development of technologies, users' requirements on the display effect of display devices are increasing.

SUMMARY

The present disclosure provides a method and apparatus for displaying an image and a storage medium. The technical solutions are as follows.

In an aspect, a method for displaying an image is provided. The method is applicable to an apparatus for displaying an image of a display device. The display device includes a backlight module, a first display panel, and a second display panel that are laminated sequentially, wherein the backlight module includes a plurality of backlight sections arranged in an array and a plurality of backlight sources, each of the backlight sections being provided with at least one of the backlight sources, and wherein the first display panel includes a black-and-white display panel of a first resolution, the second display panel includes a color display panel of a second resolution, the first resolution being less than the second resolution. The method includes:
  acquiring a first target image with a third resolution and a second target image with a fourth resolution, wherein both the third resolution and the fourth resolution are less than the second resolution, and the first target image includes a plurality of first image regions in one-to-one correspondence with the plurality of backlight sections;
  determining a reference grayscale value of each of the backlight sections based on grayscale values of respective pixels in the first image region corresponding to the backlight section;
  determining grayscale values of respective pixels in a first display image based on grayscale values of respective pixels in the first target image, wherein a resolution of the first display image is the first resolution;
  determining grayscale values of respective pixels in a second display image based on the grayscale values of the respective pixels in the first target image, grayscale values of respective pixels in the second target image, the reference grayscale values of the plurality of backlight sections, and the grayscale values of the respective pixels in the first display image;
  driving each of the backlight sources to emit light based on the reference grayscale value of the backlight section where the backlight source is disposed;
  driving the first display panel to perform display based on the first display image; and
  driving the second display panel to perform display based on the second display image.

Optionally, determining the reference grayscale value of each of the backlight sections based on the grayscale values of the respective pixels in the first image region corresponding to the backlight section includes:
  for each of the backlight sections, determining the reference grayscale value of the backlight section based on a maximum grayscale value of the respective pixels in the first image region corresponding to the backlight section, wherein the reference grayscale value is positively correlated with the maximum grayscale value.

Optionally, determining the reference grayscale value of the backlight section based on the maximum grayscale value of the respective pixels in the first image region corresponding to the backlight section includes:
  determining the reference grayscale value of the backlight section based on the maximum grayscale value and an average grayscale value of the respective pixels in the first image region corresponding to the backlight section, wherein the reference grayscale value is further positively correlated with the average grayscale value.

Optionally, determining the reference grayscale value of each of the backlight sections based on the grayscale values of the respective pixels in the first image region corresponding to the backlight section includes:
  acquiring a plurality of initial reference grayscale values by determining, for each of the backlight sections, the initial reference grayscale value of the backlight section based on the grayscale values of the respective pixels in the first image region corresponding to the backlight section; and
  determining the reference grayscale value of each of the backlight sections based on a target initial reference grayscale value of a target backlight section of the plurality of backlight sections, wherein the target backlight section is disposed at a center of the plurality of backlight sections.

Optionally, determining the grayscale values of the respective pixels in the second display image based on the grayscale values of the respective pixels in the first target image, the grayscale values of the respective pixels in the second target image, the reference grayscale values of the plurality of backlight sections, and the grayscale values of the respective pixels in the first display image includes:
  updating the grayscale values of the respective pixels in the first target image based on the reference grayscale values of the plurality of backlight sections;
  updating the grayscale values of the respective pixels in the second target image based on the reference grayscale values of the plurality of backlight sections; and
  determining the grayscale values of the respective pixels in the second display image based on the grayscale values and updated grayscale values of the respective pixels in the first target image, the grayscale values and updated grayscale values of the respective pixels in the second target image, and the grayscale values of the respective pixels in the first display image.

Optionally, updating the grayscale values of the respective pixels in the first target image based on the reference grayscale values of the plurality of backlight sections includes:
  for each first pixel in each of the first image regions, determining a distance between the first pixel and each of at least one first target backlight section, wherein the at least one first target backlight section includes a backlight section corresponding to the first image region where the first pixel is disposed, and a backlight region, a distance between which and the backlight section corresponding to the first image region where the first pixel is disposed is less than a distance threshold;

determining a light-splitting weight of light emitted by the at least one first target backlight section to the first pixel based on the distance between the first pixel and each first target backlight section; and updating the grayscale value of the first pixel based on a reference grayscale value of the at least one first target backlight section and the light-splitting weight of the light emitted by each first target backlight section to the first pixel.

Optionally, determining the light-splitting weight of the light emitted by the at least one first target backlight section to the first pixel based on the distance between the first pixel and each first target backlight section includes:

for each of the first pixels, acquiring the light-splitting weight of each first target backlight section to the first pixel by calculating the distance between the first pixel and each first target backlight section with a first point diffusion curve algorithm, wherein the at least one first target backlight section includes the backlight section corresponding to the first image region where the first pixel is disposed, and a backlight region in an F1*F2 neighborhood of the backlight section corresponding to the first image region where the first pixel is disposed, F1 and F2 being integers greater than 1.

Optionally, the second target image includes a plurality of second image regions in one-to-one correspondence with the plurality of backlight sections; and updating the grayscale values of the respective pixels in the second target image based on the reference grayscale values of the plurality of backlight sections includes:

for each second pixel in each of the second image regions, determining a distance between the second pixel and each of at least one second target backlight section, wherein the at least one second target backlight section includes a backlight section corresponding to the second image region where the second pixel is disposed, and a backlight region, a distance between which and the backlight section corresponding to the second image region where the second pixel is disposed is less than a distance threshold;

determining a light-splitting weight of light emitted by the at least one second target backlight section to the second pixel based on the distance between the second pixel and each second target backlight section; and updating the grayscale value of the second pixel based on a reference grayscale value of the at least one second target backlight section and the light-splitting weight of the light emitted by each second target backlight section to the second pixel.

Optionally, determining the light-splitting weight of the light emitted by the at least one second target backlight section to the second pixel based on the distance between the second pixel and each second target backlight section includes:

for each of the second pixels, acquiring the light-splitting weight of each second target backlight section to the second pixel by calculating the distance between the second pixel and each second target backlight section with a second point diffusion curve algorithm, wherein the at least one second target backlight section includes the backlight section corresponding to the second image region where the second pixel is disposed, and a backlight region in an F1*F2 neighborhood of the backlight section corresponding to the second image region where the second pixel is disposed, F1 and F2 being integers greater than 1.

Optionally, the second display image includes a central region sub-image and a peripheral region sub-image surrounding the central region sub-image; and determining the grayscale values of the respective pixels in the second display image based on the grayscale values of the respective pixels in the first target image, the grayscale values of the respective pixels in the second target image, the reference grayscale values of the plurality of backlight sections, and the grayscale values of the respective pixels in the first display image includes:

determining a first theoretical transmittance of the first target image and a second theoretical transmittance of the second target image;

determining a first transmittance of the first display panel based on the grayscale values of the respective pixels in the first display image, a first gamma parameter of the first display panel, minimum output light brightness of the first display panel, and maximum output light brightness of the first display panel;

determining a second transmittance of a first panel region of the second display panel based on the first theoretical transmittance, the first transmittance, and the updated grayscale values of the respective pixels in the first target image;

determining a third transmittance of a second panel region of the second display panel based on the second theoretical transmittance, the first transmittance, and the updated grayscale values of the respective pixels in the second target image, wherein the second panel region is disposed at a center of the second display panel and configured to display the central region sub-image, and the first panel region is surrounded the second panel region and configured to display the peripheral region sub-image;

determining grayscale values of respective pixels of the peripheral region sub-image based on the second transmittance, a second gamma parameter of the second display panel, minimum output light brightness of the second display panel, and maximum output light brightness of the second display panel; and determining grayscale values of respective pixels of the central region sub-image based on the third transmittance, the second gamma parameter of the second display panel, the minimum output light brightness of the second display panel, and the maximum output light brightness of the second display panel.

Optionally, the first gamma parameter is equal to 1 and the second gamma parameter is equal to 2.2.

Optionally, determining the grayscale values of the respective pixels in the first display image based on the grayscale values of the respective pixels in the first target image includes:

acquiring an initial image with a fifth resolution by processing the first target image with a bilinear interpolation algorithm, wherein the fifth resolution is less than the first resolution; and acquiring the first display image by performing first edge pixel supplementing processing on the initial image, wherein the first edge pixel supplementing processing is pixel filling processing for a region with an edge distal from a center in the initial image.

Optionally, performing first edge pixel supplementing processing on the initial image includes:

adding a plurality of first supplementing pixels to a side, distal from the center, of a first edge in the initial image, wherein a grayscale value of each of the first supplementing pixels is equal to a grayscale value of a third pixel, which is disposed in the same column as the first supplementing pixel, in the first edge;

adding a plurality of second supplementing pixels to a side, distal from the center, of a second edge in the initial image, wherein a grayscale value of each of the second supplementing pixels is equal to a grayscale value of a fourth pixel, which is disposed in the same column as the second supplementing pixel, in the second edge;

adding a plurality of third supplementing pixels to a side, distal from the center, of a third edge in the initial image, wherein a grayscale value of each of the third supplementing pixels is equal to a grayscale value of a fifth pixel, which is disposed in the same row as the third supplementing pixel, in the third edge; and adding a plurality of fourth supplementing pixels to a side, distal from the center, of a fourth edge in the initial image, wherein a grayscale value of each of the fourth supplementing pixels is equal to a grayscale value of a sixth pixel, which is disposed in the same row as the fourth supplementing pixel, in the fourth edge, wherein both the first edge and the second edge are parallel to a pixel row direction, and both the third edge and the fourth edge are parallel to a pixel column direction.

Optionally, a size of the first display panel is greater than a size of the second display panel, and a number of pixels in the second display panel is an integer multiple of a number of pixels in the first display panel; and after driving the second display panel to perform display based on the second display image, the method further includes:

determining positions of effective pixels of the first display panel, wherein an orthographic projection of the effective pixel on the second display panel is disposed within the second display panel;

determining grayscale values of respective pixels in a third display image based on a size relationship of a first size of the pixel in the first display panel and a second size of the pixel in the second display panel, and the grayscale values of the respective pixels in the second display image;

acquiring a fourth display image by performing second edge supplementing processing on the third display image based on the positions of the effective pixels of the first display panel, wherein the second edge supplementing processing is pixel filling processing for a region with an edge distal from the center in the third display image; and displaying the fourth display image in the first display panel.

Optionally, performing second edge supplementing processing on the third display image based on the positions of the effective pixels of the first display panel includes:

adding a plurality of fifth supplementing pixels to a side, distal from the center, of at least one row edge in the third display image based on the positions of the effective pixels of the first display panel, wherein a grayscale value of each of the fifth supplementing pixels is equal to a grayscale value of a seventh pixel, which is closest to the fifth supplementing pixel and disposed in the same column as the fifth supplementing pixel in the third display image; and adding a plurality of sixth supplementing pixels to a side, distal from the center, of at least one column edge in the third display image based on the positions of the effective pixels of the first display panel, wherein a grayscale value of each of the sixth supplementing pixels is equal to a grayscale value of an eighth pixel, which is closest to the sixth supplementing pixel and disposed in the same row as the sixth supplementing pixel in the third display image.

Optionally, grayscale values of pixels in the $(i+m)^{th}$ row in the third display image satisfy:

$$sub1(i+m, :) = a1 * \text{mean}$$
$$\left(\text{main}\left(\frac{i-x1}{n1}*n2+c*m-(m-1):\frac{i-x1}{n1}*n2+c*(m+1)-m, :\right)\right); +n1*$$
$$\max\left(\text{main}\left(\frac{i-x1}{n1}*n2+c*m-(m-1):\frac{i-x1}{n1}*n2+c*(m+1)-m, :\right)\right)$$

and grayscale values of pixels in the $(j+m)^{th}$ column in the third display image satisfy:

$$sub2(:, j+m) = a1 * \text{mean}$$
$$\left(\text{main}\left(:, \frac{j-y1}{n1}*n2+c*m-(m-1):\frac{j-y1}{n1}*n2+c*(m+1)-m\right)\right);$$
$$+b1 * \max$$
$$\left(\text{main}\left(:, \frac{j-y1}{n1}*n2+c*m-(m-1):\frac{j-y1}{n1}*n2+c*(m+1)-m\right)\right)$$

wherein the size relationship satisfies: a total size n1*d1 of n1 pixels in the first display panel is equal to a total size n2*d2 of n2 pixels in the second display panel, d1 is the first size of each pixel in the first display panel, d2 is the second size of each pixel in the second display panel, i ranges from x1 to x2, a ratio of i−x1 to n1 is an integer, j ranges from y1 to y2, and a ratio of j−y1 to n1 is an integer; x1 is a row number of a first row of pixels in the effective pixels in the first display panel, x2 is a row number of a last row of pixels in the effective pixels in the first display panel, y1 is a column number of a first column of pixels in the effective pixels in the first display panel, and y2 is a column number of a last column of pixels in the effective pixels in the first display panel; a is a weight coefficient of an average grayscale value, and b is a weight coefficient of the maximum grayscale value; and mean( ) is configured to represent the average grayscale value, max( ) is configured to represent the maximum grayscale value, and c is configured to indicate that a grayscale value of one pixel in the third display image is determined by grayscale values of c pixels in the second display image.

Optionally, the first display panel includes a plurality of third panel regions which are in one-to-one correspondence with the plurality of backlight sections; the second display panel includes a plurality of fourth panel regions which are in one-to-one correspondence with the plurality of backlight sections; and determining the positions of the effective pixels of the first display panel includes:

acquiring a test image;

determining a target third panel region in the plurality of third panel regions and a target fourth panel region in the plurality of fourth panel regions based on brightness of respective pixels in the test image displayed by the display device, wherein an alignment accuracy between the target third panel region and the target fourth panel region is greater than the alignment accuracy between another third panel region and the corresponding fourth panel region; and determining the positions of the effective pixels of the first display panel based on a position of the target third panel region on the first display panel, the size of the first display panel, and the size of the second display panel.

Optionally, the test image includes a plurality of test patterns; and the brightness of the test patterns displayed in the target third panel region and the target fourth panel region is higher than the brightness of the test patterns displayed in the other panel regions.

In another aspect, an apparatus for displaying an image is provided. The apparatus for displaying an image includes a processor and a memory storing at least one computer program therein, wherein the processor, when executing the computer program stored in the memory, is caused to perform the method for displaying the image described in the above aspect.

In a further aspect, a display device is provided. The display device includes the apparatus for displaying the image described in the above aspect, and a backlight module, a first display panel, and a second display panel that are laminated sequentially.

the backlight module includes a plurality of backlight sections arranged in an array and a plurality of backlight sources, each of the backlight sections being provided with at least one of the backlight sources; and the first display panel includes a black-and-white display panel of a first resolution, and the second display panel includes a color display panel of a second resolution, the first resolution being less than the second resolution; and Optionally, the display device is a wearable display device.

In a still further aspect, a computer device is provided.

The computer device includes a processor and a memory storing at least one computer program therein, wherein the processor, when executing the computer program stored in the memory, is caused to perform the method for displaying the image described in the above aspect.

In a still further aspect, a computer-readable storage medium is provided. The computer-readable storage medium stores at least one instruction therein, wherein the at least one instruction, when loaded and executed by a processor, causes the processor to perform the method for displaying the image described in the above aspect.

In a still further aspect, a screen driving board is provided. The screen driving board includes:

a time sequence controller, configured to determine grayscale values of respective pixels in a first display image and grayscale values of respective pixels in a second display image based on a first target image and a second target image and according to the method described in the above aspect, and generate a time sequence control signal of a first display panel and a time sequence control signal of a second display panel;

a voltage converting circuit, configured to generate a reference voltage signal and a row driving signal based on a power source; and a voltage generating circuit, connected to the voltage converting circuit and configured to generate a driving voltage required by the grayscale values of the respective pixels in the first display image and a driving voltage required by the grayscale values of the respective pixels in the second display image based on the reference voltage signal, wherein the time sequence control signal of the first display panel and the row driving signal are provided to a row driving circuit of the first display panel, and the time sequence control signal of the second display panel and the row driving signal are provided to a row driving circuit of the second display panel; the grayscale values of the respective pixels in the first display image, the time sequence control signal of the first display panel, and the driving voltage required by the grayscale values of the respective pixels in the first display image are provided to a column driving circuit of the first display panel; and the grayscale values of the respective pixels in the second display image, the time sequence control signal of the second display panel, and the driving voltage required by the grayscale values of the respective pixels in the second display image are provided to a column driving circuit of the second display panel.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 14 is a diagram showing an offset direction of the first display panel relative to the second display panel according to an embodiment of the present disclosure;

FIG. 15 is a flowchart of performing second edge pixel supplementing processing on a third display image according to an embodiment of the present disclosure;

DETAILED DESCRIPTION

For clearer descriptions of the objectives, technical solutions and advantages in the present disclosure, the embodiments of the present disclosure are described in further detail below with reference to the accompanying drawings.

In the related art, a traditional liquid crystal display device includes a backlight module and a liquid crystal display panel. The backlight module is disposed on a non-light-emergent surface of the liquid crystal display panel, and provides backlight for the liquid crystal display panel. In order to ensure normal display of the liquid crystal display panel, the backlight module may keep a constant on-state.

However, the constant on-state of the backlight module may cause high energy consumption of the liquid crystal display device. In addition, the light leakage property of liquid crystals in the liquid crystal display device may cause a low contrast of an image displayed by the liquid crystal display device and thus a poor display effect.

Figure 1:
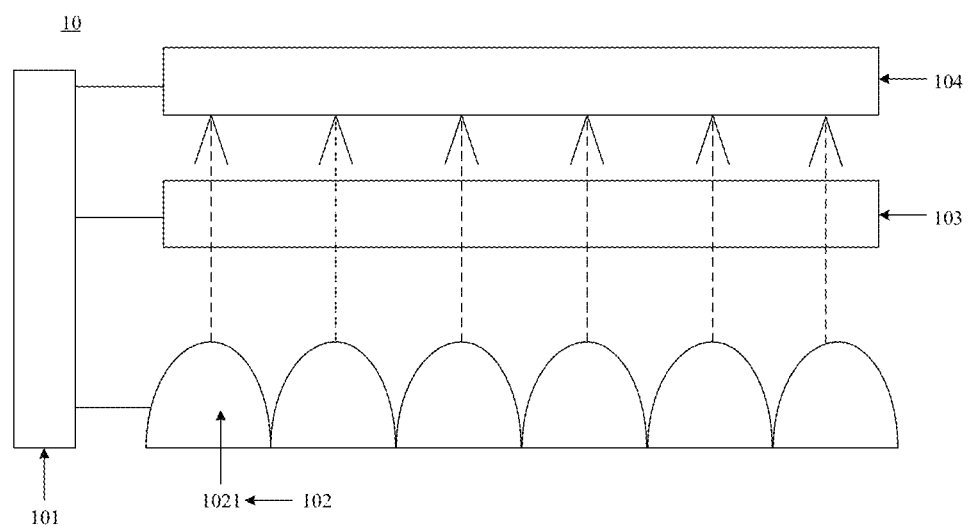
FIG. 1 is a structural diagram of a display device according to an embodiment of the present disclosure.

FIG. 1 is a structural diagram of a display device according to an embodiment of the present disclosure. Referring to FIG. 1, it can be seen that the display device 10 may include an apparatus for displaying an image 101, a backlight module 102, a first display panel 103 and a second display panel 104. The backlight module 102, the first display panel 103 and the second display panel 104 are laminated sequentially and all may be connected to the apparatus for displaying the image 101.

The backlight module 102 may include a plurality of backlight sections arranged in an array and a plurality of backlight sources 1021. Each of the backlight sections may be provided with at least one of the backlight sources 1021. Each of the backlight sources 1021 may be configured to emit light for providing backlight for the first display panel 103 and the second display panel 104. The first display panel 103 may be a black-and-white display panel of a first resolution, the second display panel 104 may be a color display panel of a second resolution, and the first resolution may be less than the second resolution. Exemplarily, the first resolution may be 720*720 and the second resolution may be 4320*4320.

Optionally, the display device may be a wearable display device. For example, the display device may be a virtual reality (VR) device.

Figure 2:
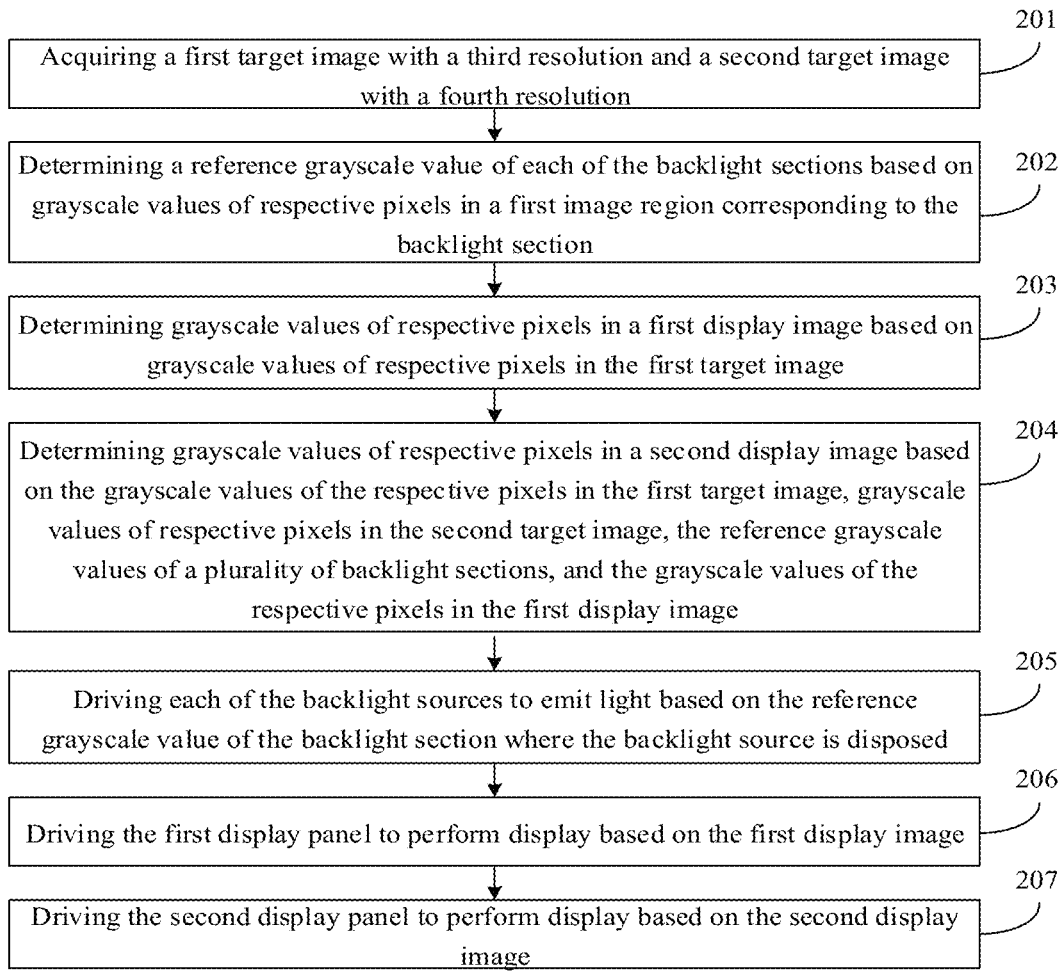
FIG. 2 is a flowchart of a method for displaying an image according to an embodiment of the present disclosure.

FIG. 2 is a flowchart of a method for displaying an image according to an embodiment of the present disclosure. The method may be applicable to the apparatus for displaying the image 101 of the display device 10. Referring to FIG. 2, it can be seen that the method may include the following steps.

In step 201, a first target image with a third resolution and a second target image with a fourth resolution are acquired.

In the embodiment of the present disclosure, the display device 10 may perform display based on a received source image in a film source. The source image in the film source may be a color image with a second resolution. The display device may include a processing module for processing the source image. The processing module may receive the source image, and acquire the first target image with the third resolution and the second target image with the fourth resolution by processing the source image. The apparatus for displaying the image 101 in the display device may be connected to the processing module and may acquire the first target image with the third resolution and the second target image with the fourth resolution from the processing module. Both the first target image and the second target image may be color images. The first target image may include a plurality of first image regions in one-to-one correspondence with the plurality of backlight sections.

Figure 3:
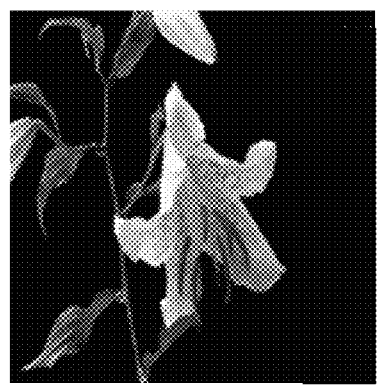
FIG. 3 is a diagram of a first target image according to an embodiment of the present disclosure.
Figure 4:
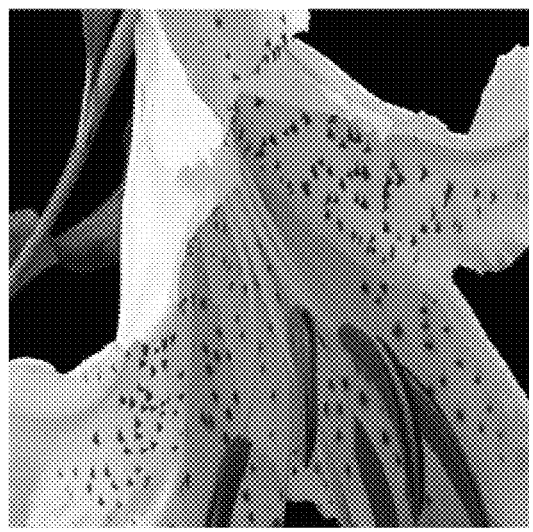
FIG. 4 is a diagram of a second target image according to an embodiment of the present disclosure.

Referring to FIG. 3, the first target image may be an image acquired by down-sampling the source image. Referring to FIG. 4, the second target image may be an image acquired by cropping the central region of the source image. For example, it is assumed that the source image may be divided into 3 rows and 3 columns, 9 regions in total, the second target image may be an image of a region in the second row and second column among the 9 regions of the source image.

Optionally, both the third resolution and the fourth resolution may be less than the second resolution. Exemplarily, the third resolution may be 1080*1080 and the fourth resolution may be 1440*1440.

In step 202, for each of the backlight sections, a reference grayscale value of each of the backlight sections is determined based on grayscale values of respective pixels in the first image region corresponding to the backlight section.

In the embodiment of the present disclosure, the plurality of first image regions included in the first target image may be in one-to-one correspondence with the plurality of backlight sections. For each of the backlight sections, the apparatus for displaying the image 101 of the display device 10 may determine the reference grayscale value of the backlight section based on the grayscale values of the respective pixels in the first image region corresponding to the backlight section.

The reference grayscale value may be positively correlated with the grayscale values of the respective pixels in the first image region. That is, the larger the grayscale values of the respective pixels in the first image region are, the larger the reference grayscale value determined by the apparatus for displaying the image 101 is; and the smaller the grayscale values of the respective pixels in the first image region are, the smaller the reference grayscale value determined by the apparatus for displaying the image 101 is. Moreover, the smaller reference grayscale value of the backlight section indicates the lower brightness of the first target image in the first image region corresponding to the backlight section. The larger reference grayscale value of the backlight section indicates the higher brightness of the first target image in the first image region corresponding to the backlight section.

In the embodiment of the present disclosure, the number of the determined reference grayscale values may be the same as the number of the backlight sections included in the backlight module. Moreover, the plurality of first image regions are in one-to-one correspondence with the plurality of backlight sections. That is, the number of the determined reference grayscale values may also be the same as the number of the first image regions included in the first target image.

Exemplarily, it is assumed that the backlight module 102 has 30*30 backlight sections, the number of the first image regions included in the first target image may be 30*30 and the number of the reference grayscale values determined in step 202 may also be 30*30.

In step 203, grayscale values of respective pixels in a first display image are determined based on grayscale values of respective pixels in the first target image.

In the embodiment of the present disclosure, as the third resolution of the first target image acquired in step 201 above is different from the first resolution, the apparatus for displaying the image 101 may determine the grayscale values of the respective pixels in the first display image based on the grayscale values of the respective pixels in the first target image. Thus, it may be convenient for the first display panel 103 to display an image with the same resolution as the first resolution of the first display panel 103. For example, the first display panel 103 may display the first display image, and the resolution of the first display image is the first resolution.

Optionally, it is assumed that the image displayed by the first display panel 103 is the first display image, the first display image may be a grayscale image as the first display panel 103 is the black-and-white display panel. When acquiring the first display image based on the first target image, the apparatus for displaying the image 101 needs to perform grayscale processing on the first target image firstly and then sample the first target image subjected to the grayscale processing, thereby acquiring the first display image.

Exemplarily, the apparatus for displaying the image 101 may acquire the first display image with the resolution of 720*720 by down-sampling the first target image with the resolution of 1080*1080 which has subjected to grayscale processing.

In step 204, grayscale values of respective pixels in a second display image are determined based on the grayscale values of the respective pixels in the first target image, grayscale values of respective pixels in the second target image, the reference grayscale values of the plurality of backlight sections, and the grayscale values of the respective pixels in the first display image.

In the embodiment of the present disclosure, the apparatus for displaying the image 101 may determine the grayscale values of the respective pixels in the second display image based on the grayscale values of the respective pixels in the first target image, the grayscale values of the respective pixels in the second target image, the reference grayscale values of the plurality of backlight sections, and the grayscale values of the respective pixels in the first display image.

In step 205, each of the backlight sources is driven to emit light based on the reference grayscale value of the backlight section where the backlight source is disposed.

In the embodiment of the present disclosure, the apparatus for displaying the image 101 may control the respective backlight sources 1021 in the backlight module 102 to emit light respectively and the brightness of the light emitted by the plurality of backlight sources 1021 may be the same or different. For each of the backlight sources 1021, the apparatus for displaying the image 101 may drive the backlight source 1021 to emit light based on the reference grayscale value of the backlight section where the backlight source 1021 is disposed.

For each of the backlight sources 1021, the brightness of the light emitted by the backlight source 1021 may be positively correlated with the reference grayscale value of the backlight section where the backlight source 1021 is disposed. That is, for each of the backlight sources 1021, the larger the reference grayscale value of the backlight section where the backlight source 1021 is disposed is, the higher the brightness of the light emitted by the backlight source 1021 under the driving of the apparatus for displaying the image 101 is; and for each of the backlight sources 1021, the smaller the reference grayscale value of the backlight section where the backlight source 1021 is disposed is, the lower the brightness of the light emitted by the backlight source 1021 under the driving of the apparatus for displaying the image 101 is.

In the embodiment of the present disclosure, as the brightness of the light emitted by the backlight source 1021 may be correlated with the reference grayscale value of the backlight section where the backlight source 1021 is disposed and the reference grayscale value of the backlight section is correlated with the grayscale values of the respective pixels in the first image region corresponding to the backlight section, when driving the backlight source 1021 to emit light based on the reference grayscale value of the backlight section where the backlight source 1021 is disposed, the apparatus for displaying the image 101 can adjust the brightness of the light emitted by the plurality of backlight sources 1021 based on the brightness of the plurality of first image regions of the first target image, which makes a light portion of an image displayed by the display device 10 lighter and a dark portion thereof darker. Thus, the image has a relatively higher contrast, and the display device has a better display effect.

In step 206, the first display panel is driven to perform display based on the first display image.

In the embodiment of the present disclosure, the apparatus for displaying the image 101 may drive the first display panel 103 to perform display based on the grayscale values of the respective pixels in the first display image. For example, the apparatus for displaying the image 101 may drive the first display panel 103 to display the first display image. As the first display panel 103 is the black-and-white display panel, the first display image displayed by the first display panel 103 may be a grayscale image.

In step 207, the second display panel is driven to perform display based on the second display image.

In the embodiment of the present disclosure, the apparatus for displaying the image 101 may drive the second display panel 104 to perform display based on the grayscale values of the respective pixels in the second display image. For example, the apparatus for displaying the image 101 may drive the second display panel 104 to display the second display image. As the second display panel 104 is the color display panel, the second display image displayed by the second display panel 104 may be a color image.

It should be noted that the order of steps of the method for displaying the image according to the embodiment of the present disclosure may be adjusted properly and the steps may also be correspondingly increased or decreased according to the situation. For example, step 203 may be executed before step 202 and step 205 to step 207 may be executed at the same time. Change methods that would be readily conceived by any person skilled in the art within the scope of the technology disclosed in the present disclosure should be within the scope of protection of the present disclosure and thus will not be described herein.

In summary, in the method for displaying the image according to the embodiment of the present disclosure, the brightness of the light emitted by the plurality of backlight sources can be adjusted based on the brightness of the plurality of first image regions of the acquired first target image, which makes the light portion of the image displayed by the display device lighter and the dark portion thereof darker. Thus, the image has a relatively higher contrast, and the display device has the better display effect. Moreover, as the brightness of the light emitted by the backlight source may be adjusted flexibly through the method according to the present disclosure, the power consumption of the display device can be effectively reduced. In addition, through the method according to the present disclosure, on the premise of adjusting the brightness of the backlight source, the image displayed by the first display panel and the image displayed by the second display panel can be controlled respectively, and thus the display effect of the display device can be further ensured.

Figure 5:
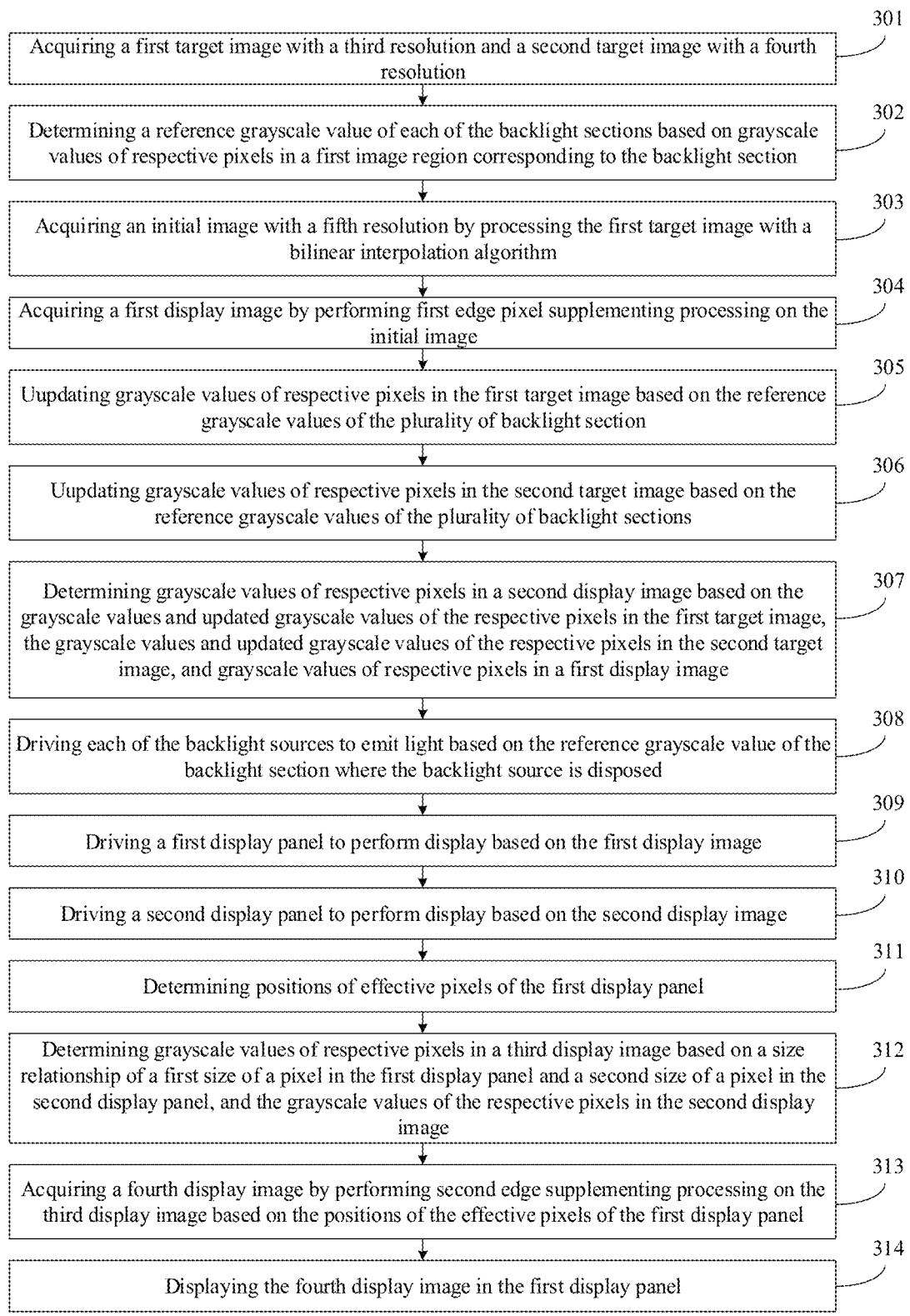
FIG. 5 is a flowchart of a method for displaying an image according to another embodiment of the present disclosure.

FIG. 5 is a flowchart of a method for displaying an image according to another embodiment of the present disclosure. The method may be applicable to the apparatus for displaying the image 101 of the display device. Referring to FIG. 5, it can be seen that the method may include the following steps.

In step 301, a first target image with a third resolution and a second target image with a fourth resolution are acquired.

In the embodiment of the present disclosure, the display device may perform display based on a received source image in a film source. The source image in the film source may be a color image with a second resolution. The display device may include a processing module for processing the source image. The processing module may receive the source image, and acquire the first target image with the third resolution and the second target image with the fourth resolution by processing the source image. The apparatus for displaying the image 101 in the display device may be connected to the processing module and may acquire the first target image with the third resolution and the second target image with the fourth resolution from the processing module. Both the first target image and the second target image may be color images. The first target image may include a plurality of first image regions in one-to-one correspondence with a plurality of backlight sections.

Referring to FIG. 3, the first target image may be an image acquired by down-sampling the source image. Referring to FIG. 4, the second target image may be an image acquired by cropping a central region of the source image. For example, it is assumed that the source image may be divided into 3 rows and 3 columns, 9 regions in total, the second target image may be an image of a region in the second row and second column among the 9 regions of the source image.

Optionally, both the third resolution and the fourth resolution may be less than the second resolution. Exemplarily, the third resolution may be 1080*1080 and the fourth resolution may be 1440*1440.

In step 302, for each of the backlight sections, a reference grayscale value of the backlight section is determined based on grayscale values of respective pixels in the first image region corresponding to the backlight section.

In the embodiment of the present disclosure, the plurality of first image regions included in the first target image may be in one-to-one correspondence with the plurality of backlight sections. As the first display panel 103 is the black-and-white display panel, the first display image may be a grayscale image. When acquiring the first display image based on the first target image, the apparatus for displaying the image 101 needs to perform grayscale processing on the first target image firstly and then determine the reference grayscale value of the backlight section corresponding to the first image region. The number of pixels included in the first target image which is subjected to grayscale processing may be equal to the number of pixels included in the first target image which is not subjected to grayscale processing.

Optionally, the process of performing grayscale processing on the first target image may be represented as:

$$ori_g(i,j)=\max(ori1_{rgb}(i,j,1:3)) \qquad \text{Formula (1)}.$$

In formula (1) above, $ori_g(i, j)$ represents the grayscale value of the pixel in the $i^{th}$ row and $j^{th}$ column in the first target image subjected to grayscale processing, Max( ) represents the maximum value, and $\max(ori1_{rgb}(i, j,1:3))$ represents the maximum pixel value in the first to third channels of the pixels in the $i^{th}$ row and the $j^{th}$ column in the first target image.

Wherein i may be a positive integer less than or equal to the number of pixel rows of the first target image, and j may be a positive integer less than or equal to the number of pixel columns of the first target image. The first to third channels are a red (R) channel, a green (G) channel and a blue (B) channel.

In the embodiment of the present disclosure, for each of the backlight sections, the apparatus for displaying the image 101 of the display device may determine the reference grayscale value of the backlight section based on the maximum grayscale value of the respective pixels in the first image region which is subjected to grayscale processing and corresponds to the backlight section. The maximum grayscale value of the respective pixels in the first image region subjected to grayscale processing may refer to the maximum grayscale value among a plurality of grayscale values of a plurality of pixels in the first image region after the first image region is subjected to grayscale processing.

The reference grayscale value may be positively correlated with the maximum grayscale value of the respective pixels in the first image region. That is, the larger the maximum grayscale value of the respective pixels in the first image region is, the larger the reference grayscale value determined by the apparatus for displaying the image 101 is; and the smaller the maximum grayscale value of the respective pixels in the first image region is, the smaller the reference grayscale value determined by the apparatus for displaying the image 101 is. Exemplarily, the apparatus for displaying the image 101 may directly determine the maximum grayscale value of the respective pixels in the first image region as the reference grayscale value.

In the embodiment of the present disclosure, the apparatus for displaying the image 101 may determine the reference grayscale value of the backlight section corresponding to the first image region based on the maximum grayscale value of the respective pixels and an average grayscale value of the respective pixels in the first image region subjected to grayscale processing. The average grayscale value of the respective pixels in the first image region subjected to grayscale processing may refer to the average grayscale value among the plurality of grayscale values of the plurality of pixels in the first image region after the first image region is subjected to grayscale processing.

The reference grayscale value may also be positively correlated with the average grayscale value of the respective pixels in the first image region. That is, the larger the average grayscale value of the respective pixels in the first image region is, the larger the reference grayscale value determined by the apparatus for displaying the image 101 is; and the smaller the average grayscale value of the respective pixels in the first image region is, the smaller the reference grayscale value determined by the apparatus for displaying the image 101 is.

In the embodiment of the present disclosure, each first image region block may be expressed with formula (2) below:

$$\text{block} = ori_g\left(\text{floor}\left(\frac{i-1}{w1}\right)*w1+1: \text{floor}\left(\frac{i-1}{w1}\right)*w1+w1,\right.$$
$$\left.\text{floor}\left(\frac{j-1}{w1}\right)*w1+1: \text{floor}\left(\frac{j-1}{w1}\right)*w1+w1\right) \quad \text{Formula (2)}$$

In formula (2) above, floor( ) represents a floor function, and w1 represents the number of rows or columns of pixels included in the first image region. Formula (2) above may indicate that the first image region block may include pixels in $$\text{floor}\left(\frac{i-1}{w1}\right)*w1+1^{th}$$

row to $$\text{floor}\left(\frac{i-1}{w1}\right)*w1+w1^{th}$$

row and $$\text{floor}\left(\frac{j-1}{w1}\right)*w1+1^{th}$$

column to $$\text{floor}\left(\frac{j-1}{w1}\right)*w1+w1^{th}$$

column.

According to formula (2) above, the reference grayscale value $BL_w$ of the backlight section corresponding to each first image region determined by the apparatus for displaying the image 101 may satisfy:

$$BL_w\left(\text{floor}\left(\frac{i-1}{w1}\right)+1, \text{floor}\left(\frac{j-1}{w1}\right)+1\right)= \quad \text{Formula (3)}$$
$$a2*\text{mean(block)}+b2*\text{max(block)}.$$

In formula (3) above, mean( ) means an average value, a2 is a weight coefficient of the average grayscale value and b2 is a weight coefficient of the maximum grayscale value. The value range of a2 may be 0≤a≤1, the value range of b2 may be 0≤b≤1, and a2+b2=1. For example, a2=0, and b2=1. In this case, the apparatus for displaying the image 101 may directly determine the maximum grayscale value of the respective pixels in the first image region as the reference grayscale value of the backlight section corresponding to the first image region.

It is assumed that the resolution of the first target image is 1080*1080, that is, the number of rows of pixels included in each first target image may be 1080, and the number of columns of pixels included in each first target image may also be 1080, the value range of i may be 1≤i≤1080, and the value range of j may be 1≤j≤1080. It is assumed that the first target image includes 30*30 first image regions, the number w1 of rows or columns of pixels included in each first image region may be equal to 1080÷30=36. That is, formula (2) above may satisfy:

$$\text{block} = ori_g\left(\text{floor}\left(\frac{i-1}{36}\right)*36+36: \text{floor}\left(\frac{i-1}{36}\right)*36+36,\right. \quad \text{Formula (4)}$$
$$\left.\text{floor}\left(\frac{j-1}{36}\right)*36+1: \text{floor}\left(\frac{j-1}{36}\right)*36+36\right).$$

Formula (3) above may satisfy:

$$BL_w\left(\text{floor}\left(\frac{i-1}{36}\right)+1, \text{floor}\left(\frac{j-1}{36}\right)+1\right)= \quad \text{Formula (5)}$$
$$a2*\text{mean(block)}+b2*\text{max(block)}.$$

In the embodiment of the present disclosure, for avoiding the problem that backlight provided by the backlight module 102 is insufficient, the apparatus for displaying the image 101 may acquire a plurality of initial reference grayscale values by determining, for each of the backlight sections, the initial reference grayscale value of the backlight section based on the grayscale values of the respective pixels in the first image region corresponding to the backlight section. The initial reference grayscale value of each of the backlight sections may be determined by the apparatus for displaying the image 101 based on the maximum grayscale value of the respective pixels and the average grayscale value of the respective pixels in the first image region corresponding to the backlight section after grayscale processing. Afterwards, the apparatus for displaying the image 101 may determine the reference grayscale value of each of the backlight sections based on a target initial reference grayscale value of a target backlight section of the plurality of backlight sections. The target backlight section is disposed at the center of the plurality of backlight sections.

The apparatus for displaying the image 101 may arrange the plurality of acquired initial reference grayscale values of the plurality of backlight sections based on to an arrangement mode of the backlight sections. That is, the plurality of initial reference grayscale values are arranged in an array and an arrangement position of each initial reference grayscale value corresponds to an arrangement position of the backlight section to which the initial reference grayscale value belongs. The apparatus for displaying the image 101 may add a plurality of supplementing grayscale values to four edges of the array formed by the plurality of initial reference grayscale values, and each supplementing grayscale value may be 0.

Exemplarily, it is assumed that the backlight module 102 includes 30*30 backlight sections, the number of the determined initial reference grayscale values may also be 30*30.

The number after the plurality of supplementing grayscale values are added may be 30+((V−1)÷2)*((V−1)÷2). That is, (V−1)÷2 rows or (V−1)÷2 columns of supplementing grayscale values may be added to each of four edges of the array formed by the plurality of initial reference grayscale values.

After the supplementing grayscale values are added, the plurality of initial reference grayscale values arranged in an array may have a plurality of V*V matrices. The plurality of initial reference grayscale values are traversed, such that each initial reference grayscale value is a matrix center of a V*V matrix.

For each V*V matrix, if the initial reference grayscale value of the matrix center is greater than 20 and less than 235 and is the maximum initial reference grayscale value in the V*V matrix, the reference grayscale value of the backlight section corresponding to the matrix center may be acquired by adding 20 to the initial reference grayscale value. If the initial reference grayscale value of the matrix center is less than the maximum initial reference grayscale value in the V*V matrix and greater than 0 and the maximum initial reference grayscale value in the V*V matrix is greater than 130, the reference grayscale value of the backlight section corresponding to the matrix center may be acquired by adding 0.8 time of a difference between the maximum initial reference grayscale value in the V*V matrix and the initial reference grayscale value of the matrix center to the initial reference grayscale value.

Optionally, if for each V*V matrix, the initial reference grayscale value center of the backlight section corresponding to the matrix center of the V*V matrix satisfies:

$$center>20\ \&\&\ center=max(BL_{TP}(i-(V-1)\div2{:}i+(V-1)\div2,j-(V-1)\div2{:}j+(V-1)\div2)),\&\ \&center<235$$

the reference grayscale value of the backlight section corresponding to the matrix center of the V*V matrix satisfies:

$$BL(i,j)=center+20.$$

If for each V*V matrix, the initial reference grayscale value center of the backlight section corresponding to the matrix center of the V*V matrix satisfies:

$$center<max(BL_{TP}(i-(V-1)\div2{:}i+(V-1)\div2,j-(V-1)\div2{:}j+(V-1)\div2))\&\ \&center>235,\&\ \&max(BL_{TP}(i-(V-1)\div2{:}i+(V-1)\div2,j-(V-1)\div2{:}j+(V-1)\div2))>130$$

the reference grayscale value of the backlight section corresponding to the matrix center of the V*V matrix satisfies:

$$BL(i,j)=center+max(BL_{TP}(i-(V-1)\div2{:}i+(V-1)\div2,j-(V-1)\div2{:}j+(V-1)\div2)-center)*0.8$$

In the above formula, && is configured to represent "and", that is, the conditions that the initial reference grayscale value center simultaneously satisfy. Wherein max (BL$_{TP}$(i−(V−1)÷2: i+(V−1)÷2, j−(V−1)÷2: j+(V−1)÷2)) is the maximum initial reference grayscale value in the V*V matrix. It is assumed that V is 5, the above conditions may be:

if for each 5*5 matrix, the initial reference grayscale value center of the backlight section corresponding to the matrix center of the 5*5 matrix satisfies:

$$center>20\ \&\&\ center=max(BL_{TP}(i-2{:}i+2,j-2{:}j+2)),\&\ \&center<235$$

the reference grayscale value of the backlight section corresponding to the matrix center of the V*V matrix satisfies:

$$BL(i,j)=center+20.$$

If for each 5*5 matrix, the initial reference grayscale value center of the backlight section corresponding to the matrix center of the 5*5 matrix satisfies:

$$center<max(BL_{TP}(i-2{:}i+2,j-2{:}j+2))\&\ \&center>235\&\ \&max(BL_{TP}(i-2{:}i+2,j-2{:}j+2))>130$$

the reference grayscale value of the backlight section corresponding to the matrix center of the 5*5 matrix satisfies:

$$BL(i,j)=center+max(BL_{TP}(i-2{:}i+2,j-2{:}j+2)-center)*0.8.$$

In step 303, an initial image with a fifth resolution is acquired by processing the first target image with a bilinear interpolation algorithm.

In the embodiment of the present disclosure, a size of the first display panel 103 may be greater than a size of the second display panel 104, which may cause that an orthographic projection of a pixel disposed on an edge in the first display panel 103 on the second display panel 104 does not falls within the second display panel 104. In this case, an effective display region of the first display panel 103 may be less than an actual display region of the first display panel 103. An orthographic projection of a pixel of the effective display region of the first display panel 103 on the second display panel 104 falls within the second display panel 104.

Exemplarily, the resolution of the first display panel 103 is 720*720, that is, the number of pixel rows and the number of pixel columns of the first display panel 103 are 720. The number of pixel rows and the number of pixel columns of the effective display region of the first display panel 103 are less than 720, and for example may be 713.

For ensuring the display effect of the display device, the apparatus for displaying the image 101 may firstly acquire initial images, the number of which is the same as the number of pixels of the effective display region of the first display panel 103. Optionally, referring to formula (6), the apparatus for displaying the image 101 may acquire the initial image sub11 with the fifth resolution by processing the first target image, which has been subjected to grayscale processing, with the bilinear interpolation algorithm.

$$sub11=f(ori_g) \quad\quad\text{Formula (6)}.$$

In formula (6) above, f( ) is configured to represent the bilinear interpolation algorithm. Exemplarily, the fifth resolution of the acquired initial image sub11 may be 713*713. That is, the initial image sub11 includes 713*713 pixels.

In step 304, a first display image is acquired by performing first edge pixel supplementing processing on the initial image.

As the fifth resolution of the initial image acquired according to step 303 above is less than the first resolution of the first display panel 103, it needs to process the initial image, such that the resolution of the processed image (first display image) may be equal to the first resolution, which facilitates the display of the first display panel 103.

In the embodiment of the present disclosure, the apparatus for displaying the image 101 may acquire the first display image by performing first edge pixel supplementing processing on the initial image. The resolution of the first display image may be equal to the first resolution of the first display panel 103. The first edge pixel supplementing processing may be pixel filling processing for a region with an edge distal from the center in the initial image.

Optionally, pixels in the initial image may be disposed in an initial region of the first display image. Pixel values of the pixels in the initial region of the first display image satisfy:

$$sub1(r:r+s1-1,c:c+s1-1)=sub11 \qquad \text{Formula (7)}.$$

In formula (7) above, sub1 is configured to represent an image acquired by performing first edge pixel supplementing processing on the initial image, r is configured to represent the row number of the first row of pixels of the initial region of the first display image in the first display image, and c is configured to represent the column number of the first column of pixels of the initial region of the first display image in the first display image, and s1 is configured to represent the number of pixel rows or the number of pixel columns of the effective display region of the first display panel 103. For example, it is assumed that s1=713, formula (7) may be:

$$sub1(r:r+712,c:c+712)=sub11.$$

The initial image may have a first edge, a second edge, a third edge, and a fourth edge. Both the first edge and the second edge may be parallel to a pixel row direction, and both the third edge and the fourth edge may be parallel to a pixel column direction. That is, the first edge is parallel to the second edge, the third edge is parallel to the fourth edge and the first edge is perpendicular to the third edge.

Figure 6:
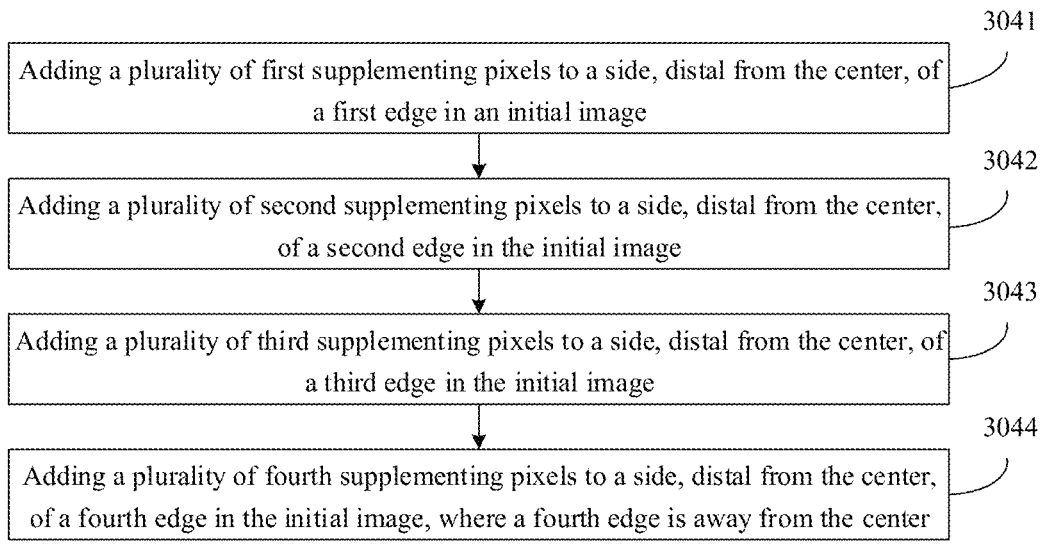
FIG. 6 is a flowchart of performing first edge pixel supplementing processing on an initial image according to an embodiment of the present disclosure.

In the embodiment of the present disclosure, referring to FIG. 6, performing first edge pixel supplementing processing on the initial image may include the following steps.

In step 3041, a plurality of first supplementing pixels are added to a side, distal from the center, of the first edge in the initial image.

A grayscale value of each of the first supplementing pixels may be equal to a grayscale value of a third pixel, which is disposed in the same column as the first supplementing pixel, in the first edge.

Exemplarily, it is assumed that the first edge is an upper edge of the initial image, the grayscale values of the plurality of first supplementing pixels may satisfy:

$$sub1(1:r-1,:)=sub1(r,:) \qquad \text{Formula (8)}.$$

Formula (8) above may means that for each column of pixels in the first display image, the grayscale values of $r^{th}$ row of pixels in the first display image are assigned to the first row of pixels to the $(r-1)^{th}$ row of pixels in the first display image.

In step 3042, a plurality of second supplementing pixels are added to a side, distal from the center, of a second edge in the initial image.

A grayscale value of each of the second supplementing pixels may be equal to a grayscale value of a fourth pixel, which is disposed in the same column as the second supplementing pixel, in the second edge.

Exemplarily, it is assumed that the second edge is a lower edge of the initial image, the grayscale values of the plurality of second supplementing pixels may satisfy:

$$sub1(r+s1:s2,:)=sub1(r+s1-1,:) \qquad \text{Formula (9)}.$$

Formula (9) above may means that for each column of pixels in the first display image, the grayscale values of the $(r+s1-1)^{th}$ row of pixels in the first display image are assigned to the $(r+s1)^{th}$ row of pixels to $s2^{th}$ row of pixels in the first display image, wherein s2 represents the number of pixel rows of the first display panel 103. For example, it is assumed that s2=720, formula (9) above may be sub1(r+713:720, :)=sub1(r+712, :).

In step 3043, a plurality of third supplementing pixels are added to a side, distal from the center, of a third edge in the initial image.

A grayscale value of each of the third supplementing pixels may be equal to a grayscale value of a fifth pixel, which is disposed in the same row as the third supplementing pixel, in the third edge. Exemplarily, it is assumed that the third edge is a left edge of the initial image, the grayscale values of the plurality of third supplementing pixels may satisfy:

$$sub1(:,1:c-1)=sub1(:c) \qquad \text{Formula (10)}.$$

Formula (10) above may means that for each row of pixels in the first display image, the grayscale values of $c^{th}$ column of pixels in the first display image are assigned to first column of pixels to the $(c-1)^{th}$ column of pixels in the first display image.

In step 3044, a plurality of fourth supplementing pixels is added to a side, distal from the center, of a fourth edge in the initial image.

A grayscale value of each of the fourth supplementing pixels is equal to a grayscale value of a sixth pixel, which is disposed in the same row as the fourth supplementing pixel, in the fourth edge.

Exemplarily, it is assumed that the fourth edge is a right edge of the initial image, the grayscale values of the plurality of fourth supplementing pixels may satisfy:

$$sub1(:c+s1:s2)=sub1(:c+s1-1) \qquad \text{Formula (11)}.$$

Formula (11) above may means that for each row of pixels in the first display image, the grayscale values of the $(c+s1-1)^{th}$ column of pixels in the first display image are assigned to the $(c+s1)^{th}$ column of pixels to the $s1^{th}$ column of pixels in the first display image.

In the embodiment of the present disclosure, after first edge pixel supplementing processing is performed on the initial image, in order to improve the transmittance of the first display panel 103, the initial image subjected to first edge pixel supplementing processing may be processed continuously. For example, referring to formula (12), the first display image sub may be acquired by properly increasing the grayscale values of the respective pixels in the initial image subjected to first edge pixel supplementing processing.

$$sub=((sub1/255)^{\gamma 0}*255 \qquad \text{Formula (12)}.$$

In formula (12) above, γ0 may be a grayscale value raise parameter. That is, the grayscale values of the respective pixels in the first display image sub acquired through formula (12) above may be relatively larger and thus the light output efficiency of the backlight module 102 may be better under the circumstance of displaying the first display image sub by the first display panel 103.

In step 305, the grayscale values of the respective pixels in the first target image are updated based on the reference grayscale values of the plurality of backlight sections.

In the embodiment of the present disclosure, grayscale values of respective pixels in the second display image displayed by the second display panel 104 may be affected by the brightness of the light emitted by the backlight source 1021 in the backlight module 102. Therefore, the apparatus for displaying the image 101 of the display device may update the grayscale values of the respective pixels in the first target image based on the reference grayscale values of the plurality of backlight sections. Thus, it is convenient for the apparatus for displaying the image 101 to determine the second display image based on the updated first target image.

The brightness of the light emitted by the backlight source 1021 is correlated with the reference grayscale value of the backlight section where the backlight source 1021 is disposed. For example, the apparatus for displaying the image 101 of the display device may drive the backlight source 1021 to emit light based on the reference grayscale value of the backlight section where the backlight source 1021 is disposed.

Figure 7:
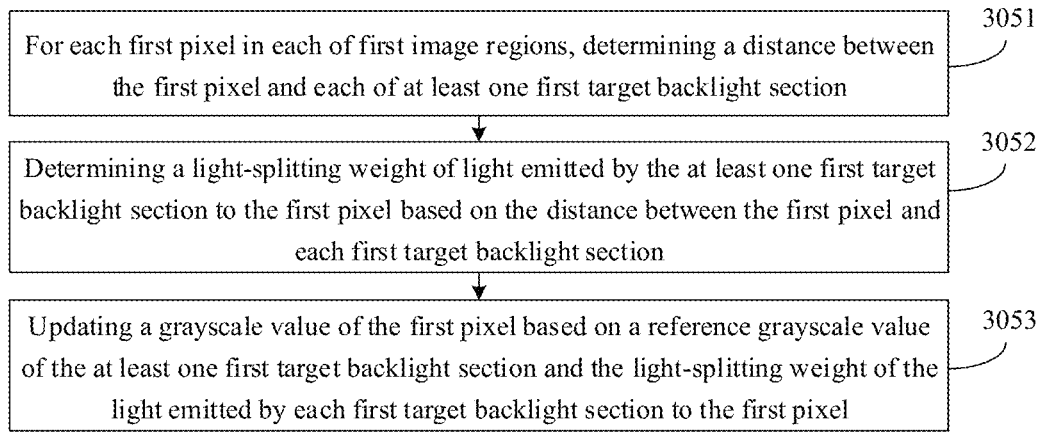
FIG. 7 is a flowchart of updating grayscale values of respective pixels in the first target image according to an embodiment of the present disclosure.

Referring to FIG. 7, step 305 may include the following steps.

In step 3051, for each first pixel in each of the first image regions, a distance between the first pixel and each of at least one first target backlight section is determined.

In the embodiment of the present disclosure, the at least one first target backlight section includes a backlight section corresponding to the first image region where the first pixel is disposed, and a backlight region, a distance between which and the backlight section corresponding to the first image region where the first pixel is disposed is less than a distance threshold.

For each first pixel in each of the first image regions, the distance between the first pixel and any first target backlight section in the backlight module 102 is equal to an arithmetic square root of the sum of a first square and a second square. The first square may be a square of a difference between an abscissa of the first pixel and an abscissa of a center pixel of the first image region corresponding to the first target backlight section, and the second square may be a square of a difference between an ordinate of the first pixel and an ordinate of the center pixel of the first image region corresponding to the first target backlight section. Moreover, the coordinates of the first pixel in the first row and first column of the first target image may be (0, 0).

Optionally, the distance $d_l(k, z)$ between the first pixel and $(k, z)^{th}$ first target backlight section in the backlight module 102 satisfies:

$$d_l(k, z) = \sqrt{(coh_{led}(k, z) - colh(1:(w1*w1)))^2 + (cow_{led}(k, z) - colw(1:(w1*w1)))^2}. \quad \text{Formula (13)}$$

The plurality of backlight sections in the backlight module 102 are arranged in a plurality of rows and a plurality of columns and the $(k, z)^{th}$ first target backlight section refers to the backlight section in the $k^{th}$ row and the $z^{th}$ column among the plurality of backlight sections. Wherein $cod_{led}(k, z)$ is the ordinate of the center pixel of the first image region corresponding to the $(k, z)^{th}$ first target backlight section, d colh(1:(w1*w1)) is the ordinate of the first pixel in the first image region, $cow_{led}(k, z)$ is the abscissa of the center pixel of the first image region corresponding to the $(k, z)^{th}$ first target backlight section and colw(1:(w1*w1)) is the abscissa of the first pixel in the first image region.

Exemplarily, it is assumed that the number of rows or columns of pixels included in each of the first image regions is w1=36, formula (13) above may be:

$$d_l(k, z) = \sqrt{(coh_{led}(k, z) - colh(1:(36*36)))^2 + (cow_{led}(k, z) - colw(1:(36*36)))^2}.$$

In step 3052, a light-splitting weight of light emitted by the at least one first target backlight section to the first pixel is determined based on the distance between the first pixel and each first target backlight section.

In the embodiment of the present disclosure, the light emitted by the first target backlight section may refer to light emitted by the backlight source 1021 included in the first target backlight section. The at least one first target backlight section may include the backlight section corresponding to the first image region where the first pixel is disposed, and a backlight region in an F1*F2 neighborhood of the backlight section corresponding to the first image region where the first pixel is disposed. F1 and F2 may be integers greater than 1, and F1 may be or not be equal to F2. K may be an integer greater than or equal to 1 and less than or equal to F1, and z may be an integer greater than or equal to 1 and less than or equal to F2.

Exemplarily, both F1 and F2 may be equal to 7, that is, the at least one first target backlight section may include: 7*7=49 backlight sections. Moreover, k and z may be an integer greater than or equal to 1 and less than or equal to 7.

In the embodiment of the present disclosure, the distance between each first pixel in each of the first image regions and the first target backlight section may be determined according to step 3051 above. Afterwards, the apparatus for displaying the image 101 may determine whether the distance between the first pixel and the first target backlight section is greater than the first distance threshold.

If the calculated distance between a certain first pixel and a certain first target backlight section is greater than the first distance threshold, it indicates that the brightness of the light emitted by the first target backlight section has a relatively less effect on the first pixel and the apparatus for displaying the image 101 may directly determine the light-splitting weight of the light emitted by the first target backlight section to the first pixel as 0.

If the calculated distance between a certain first pixel and a certain first target backlight section is less than or equal to the first distance threshold, it indicates that the brightness of the light emitted by the first target backlight section has a relatively greater effect on the first pixel and for this first pixel, the apparatus for displaying the image 101 may acquire the light-splitting weight of the first target backlight section to the first pixel by calculating the distance between the first pixel and the first target backlight section with a first point diffusion curve algorithm.

Optionally, the first point diffusion curve algorithm may be acquired by performing curve fitting based on the distance between the backlight section and the first pixel, and the brightness of the light emitted by the plurality of backlight sections. A shape of a first point diffusion curve is correlated with a shape of the backlight source included in the backlight section.

Exemplarily, the light-splitting weight determined with the first point diffusion curve algorithm may satisfy:

$$w_l(k, z) = g1 * e^{-\left(\frac{d_l(k,z)+h1}{p1}\right)^2} + g2 * e^{-\left(\frac{d_l(k,z)+h2}{p2}\right)^2}. \quad \text{Formula (14)}$$

In formula (14) above, e is a natural constant, and g1, h1, p1, g2, h2 and p2 are fitting coefficients. Exemplarily, it is assumed that g1=1.009, h1=2.887, p1=40.85, g2=−0.07413, h2=−54.92 and p2=24.19, formula (14) above may be:

$$w_l(k, z) = 1.009 * e^{-\left(\frac{d_l(k,z)+2.887}{40.85}\right)^2} - 0.07413 * e^{-\left(\frac{d_l(k,z)-54.92}{24.19}\right)^2}.$$

In the embodiment of the present disclosure, the first distance threshold may be determined based on the value of F1, the value of F2 and the number w1 of rows or columns of pixels included in each first image region. Exemplarily, it is assumed that F1=F2=7 and the number of rows or columns of pixels included in each first image region w1=36, the first distance threshold s1 may be s1=36÷2+36×(7−1)÷2=126. The unit of the first distance threshold may be the number of pixels.

That is, if the distance $d_f(k,z)$ between certain first pixel and certain first target backlight section 1021 determined according to step 3051 above is greater than the total size of 126 pixels in the first display panel, the apparatus for displaying the image 101 may determine the light-splitting weight of the first target backlight section 1021 to the first pixel as 0. If the distance $d_f(k,z)$ between certain first pixel and certain first target backlight section 1021 determined according to step 3051 above is less than or equal to the total size of 126 pixels in the first display panel, the apparatus for displaying the image 101 may substitute this distance $d_f(k,z)$ to formula (14) above and calculate the light-splitting weight $w_l(k,z)$.

In the embodiment of the present disclosure, the apparatus for displaying the image 101 may normalize a plurality of determined light-splitting weights. The sum of all normalized light-splitting weights may be equal to 1. Optionally, the light-splitting weight $W_l(k,z)$ acquired after light-splitting weight $w_l(k,z)$ is normalized may satisfy:

$$W_l(k, z) = \frac{w_l(k, z)}{\sum_1^{F1} \sum_1^{F2} w_l(k, z)}. \quad \text{Formula (15)}$$

In step 3053, the grayscale value of the first pixel is updated based on a reference grayscale value of the at least one first target backlight section and the light-splitting weight of the light emitted by each first target backlight section to the first pixel.

In the embodiment of the present disclosure, the apparatus for displaying the image 101 may perform weighted summation on the reference grayscale value of the at least one first target backlight region and the light-splitting weight of the light emitted by each first target backlight section to the first pixel and determine the grayscale value after weighted summation as the updated grayscale value of the first pixel.

Optionally, the updated grayscale value $Isim_l$ of the first pixel may satisfy:

$$Isim_l = \sum_1^{F1} \sum_1^{F2} \quad \text{Formula (16)}$$
$$W_l\left(k - \frac{F1-1}{2} : k + \frac{F1-1}{2}, z - \frac{F2-1}{2} : z + \frac{F2-1}{2}\right) +$$
$$BL_w\left(k - \frac{F1-1}{2} : k + \frac{F1-1}{2}, z - \frac{F2-1}{2} : z + \frac{F2-1}{2}\right).$$

In step 306, the grayscale values of the respective pixels in the second target image are updated based on the reference grayscale values of the plurality of backlight sections.

In the embodiment of the present disclosure, the grayscale values of the respective pixels in the second display image displayed by the second display panel 104 may be affected by the brightness of the light emitted by the backlight source 1021 in the backlight module 102. Therefore, the apparatus for displaying the image 101 of the display device may update the grayscale values of the respective pixels in the second target image based on the reference grayscale values of the plurality of backlight sections. Thus, it is convenient for the apparatus for displaying the image 101 to determine the second display image based on the updated second target image.

The second target image may include a plurality of second image regions in one-to-one correspondence with the plurality of backlight sections.

Figure 8:
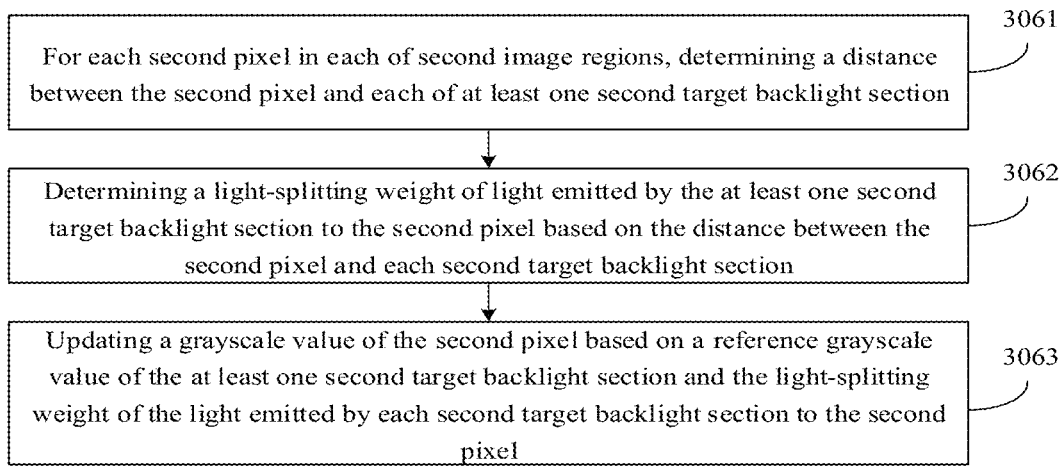
FIG. 8 is a flowchart of updating grayscale values of respective pixels in the second target image according to an embodiment of the present disclosure.

Referring to FIG. 8, step 306 may include the following steps.

In step 3061, for each second pixel in each of the second image regions, a distance between the second pixel and each of at least one second target backlight section is determined.

In the embodiment of the present disclosure, the at least one second target backlight section includes a backlight section corresponding to the second image region where the second pixel is disposed, and a backlight region, a distance between which and the backlight section corresponding to the second image region where the second pixel is disposed is less than a distance threshold.

For each second pixel in each of the second image regions, the distance between the second pixel and any second target backlight section in the backlight module 102 is equal to an arithmetic square root of the sum of a third square and a fourth square.

The third square may be a square of a difference between an abscissa of the second pixel and an abscissa of a center pixel of the second image region corresponding to the second target backlight section, and the fourth square may be a square of a difference between an ordinate of the second pixel and an ordinate of a center pixel of the second image region corresponding to the second target backlight section. Moreover, the coordinates of the second pixel in the first row and first column of the second target image may be (0, 0).

Optionally, the distance $d_h(k, z)$ between the second pixel and the $(k, z)^{th}$ second target backlight section in the backlight module 102 satisfies:

$$d_h(k, z) = \sqrt{\begin{array}{l}(coh_{led}(k, z) - colh(w2*w2)))^2 + \\ (cow_{led}(k, z) - colw(1:w2*w2)))^2\end{array}}. \quad \text{Formula (17)}$$

The plurality of backlight sections in the backlight module 102 are arranged in a plurality of rows and a plurality of columns. The $(k, z)_{th}$ second target backlight section refers to the backlight section in the $k^{th}$ row and the $z^{th}$ column among the plurality of backlight sections, and w2 represents the number of rows or columns of pixels included in the second image region. $coh_{led}(k, z)$ is the ordinate of the center pixel of the second image region corresponding to the $(k, z)_{th}$ second target backlight section and $colh(1:(w2*w2))$ is the ordinate of the second pixel in the second image region. $cow_{led}(k,z)$ is the abscissa of the center pixel of the second image region corresponding to the second target backlight section and $colw(1:(w2*w2))$ is the ordinate of the second pixel in the second image region.

Exemplarily, it is assumed that the number of rows or columns of pixels included in each second image region is w2=144, formula (17) above may be:

$$d_h(k, z) = \sqrt{\begin{array}{l}(coh_{led}(k, z) - colh(1:(144*144)))^2 + \\ (cow_{led}(k, z) - colw(1:(144*144)))^2\end{array}}.$$

In step 3062, a light-splitting weight of light emitted by the at least one second target backlight section to the second pixel is determined based on the distance between the second pixel and each second target backlight section.

In the embodiment of the present disclosure, the light emitted by the second target backlight section may refer to light emitted by the backlight source 1021 included in the second target backlight section. The at least one second target backlight section includes the backlight section corresponding to the second image region where the second pixel is disposed, and a backlight region in an F1*F2 neighborhood of the backlight section corresponding to the second image region where the second pixel is disposed. F1 and F2 may be integers greater than 1, and F1 may be or not be equal to F2. K may be an integer greater than or equal to 1 and less than or equal to F1, and z may be an integer greater than or equal to 1 and less than or equal to F2.

Exemplarily, both F1 and F2 may be equal to 7, that is, the at least one second target backlight section may include 7*7=49 backlight sections. Moreover, k and z may be an integer greater than or equal to 1 and less than or equal to 7.

In the embodiment of the present disclosure, the distance between each second pixel in each of the second image regions and the second target backlight section may be determined according to step 3061 above. Afterwards, the apparatus for displaying the image 101 may determine whether the distance between the second pixel and the second target backlight section is greater than the second distance threshold.

If the calculated distance between a certain second pixel and a certain second target backlight section is greater than the second distance threshold, it indicates that the brightness of the light emitted by the second target backlight section has a relatively less effect on the second pixel and the apparatus for displaying the image 101 may directly determine the light-splitting weight of the light emitted by the second target backlight section to the second pixel as 0.

If the calculated distance between a certain second pixel and a certain second target backlight section is less than or equal to the second distance threshold, it indicates that the brightness of the light emitted by the second target backlight section has a relatively greater effect on the second pixel. For this second pixel, the apparatus for displaying the image 101 may acquire the light-splitting weight of the second target backlight section to the second pixel by calculating the distance between the second pixel and the second target backlight section with a second point diffusion curve algorithm.

Optionally, the second point diffusion curve algorithm may be acquired by performing curve fitting based on the distance between the backlight section and the second pixel, and the brightness of the light emitted by the plurality of backlight sections. A shape of a second point diffusion curve is also correlated with a shape of the backlight source included in the backlight section.

Exemplarily, the light-splitting weight $w_h(k, z)$ determined with the second point diffusion curve algorithm may satisfy:

$$w_h(k, z) = g3 * e^{-\left(\frac{d_h(k,z)+h3}{p3}\right)^2} + g4 * e^{-\left(\frac{d_l(k,z)+h4}{p4}\right)^2}. \quad \text{Formula (18)}$$

In formula (18) above, e is a natural constant, and g3, h3, p3, g4, h4 and p4 are fitting coefficients. Exemplarily, it is assumed that g3=−0.1615, h3=38.23, p3=43.37, g4=−1.189, h4=69.1 and p4=217.3, formula (18) above may be:

$$w_h(k, z) = -0.1615 * e^{-\left(\frac{d_h(k,z)+38.23}{43.37}\right)^2} - 1.189 * e^{-\left(\frac{d_l(k,z)+69.1}{217.3}\right)^2}.$$

In the embodiment of the present disclosure, the second distance threshold may be determined based on F1, F2 and the number w2 of rows or columns of pixels included in each second image region. Exemplarily, it is assumed that F1=F2=7 and the number of rows or columns of pixels included in each second image region w2=144, the second distance threshold s2 may be s2=144÷2+144×(7−1)÷2=504. The unit of the second distance threshold may be the number of pixels.

That is, if the distance $d_h(k, z)$ between a certain second pixel and a certain second target backlight section 1021 determined according to step 3061 above is greater than the total size of 504 pixels in the second display panel, the apparatus for displaying the image 101 may determine the light-splitting weight of the second target backlight section 1021 to the second pixel as 0. If the distance $d_h(k, z)$ between a certain second pixel and a certain second target backlight section 1021 determined according to step 3061 above is less than or equal to the total size of 504 pixels in the second display panel, the apparatus for displaying the image 101 may substitute this distance $d_h(k, z)$ to formula (18) above and calculate the light-splitting weight.

In the embodiment of the present disclosure, the apparatus for displaying the image 101 may normalize a plurality of determined light-splitting weights. The sum of all normalized light-splitting weights may be equal to 1. Optionally, the light-splitting weight $W_l(k, z)$ acquired after $w_l(k,z)$ is normalized may satisfy:

$$W_h(k, z) = \frac{w_h(k, z)}{\sum_1^{F1} \sum_1^{F2} w_h(k, z)}. \quad \text{Formula (19)}$$

In step 3063, the grayscale value of the second pixel is updated based on a reference grayscale value of the at least one second target backlight section and the light-splitting weight of the light emitted by each second target backlight section to the second pixel.

In the embodiment of the present disclosure, the apparatus for displaying the image 101 may perform weighted summation on the reference grayscale value of at least one second target backlight region and the light-splitting weight of the light emitted by each second target backlight section to the second pixel and determine the grayscale value acquired after weighted summation as the updated grayscale value of the second pixel.

Optionally, the updated grayscale value of the second pixel may satisfy:

$$Isim_h = \sum_1^{F1} \sum_1^{F2} W_l\left(k - \frac{F1-1}{2} : k + \frac{F1-1}{2}, z - \frac{F2-1}{2} : z + \frac{F2-1}{2}\right) * BL_w\left(k - \frac{F1-1}{2} : k + \frac{F1-1}{2}, z - \frac{F2-1}{2} : z + \frac{F2-1}{2}\right). \quad \text{Formula (20)}$$

In step 307, the grayscale values of the respective pixels in the second display image are determined based on the grayscale values and updated grayscale values of the respective pixels in the first target image, the grayscale values and updated grayscale values of the respective pixels in the second target image, and the grayscale values of the respective pixels in the first display image.

In the embodiment of the present disclosure, the second display image may include a central region sub-image and a peripheral region sub-image surrounding the central region sub-image. The grayscale values of the respective pixels in the peripheral region sub-image may be correlated with the grayscale values and updated grayscale values of the respective pixels in the first target image, and the grayscale values of the respective pixels in the first display image. Moreover, the grayscale values of the respective pixels in the central region sub-image may be correlated with the grayscale values and updated grayscale values of the respective pixels in the second target image, and the grayscale values of the respective pixels in the first display image.

Figure 9:
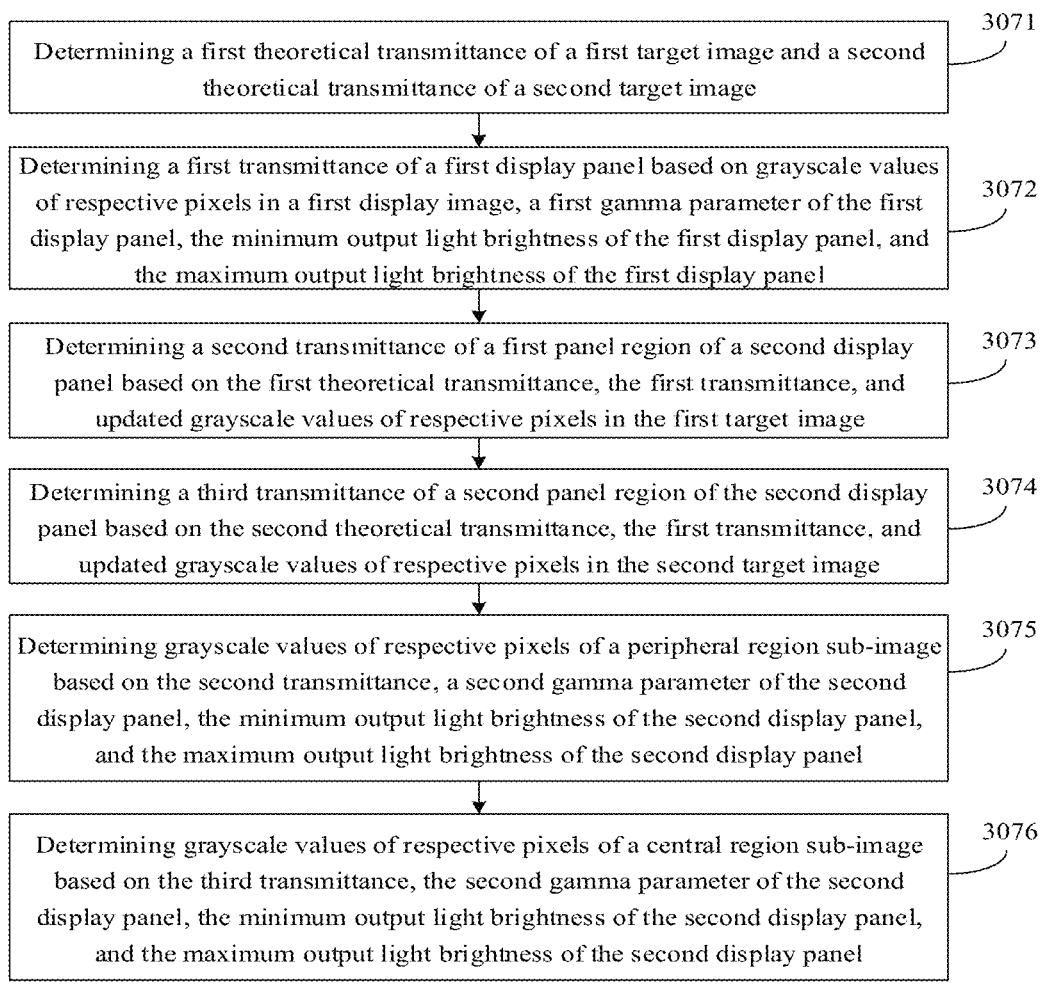
FIG. 9 is a flowchart of determining grayscale values of respective pixels in a second display image according to an embodiment of the present disclosure.

Referring to FIG. 9, step 307 may include the following steps.

In step 3071, a first theoretical transmittance of the first target image and a second theoretical transmittance of the second target image are determined.

In the embodiment of the present disclosure, the apparatus for displaying the image 101 may determine the first theoretical transmittance of the first target image based on the grayscale values of the respective pixels in the first target image, and determine the second theoretical transmittance of the second target image based on the grayscale values of the respective pixels in the second target image.

Optionally, the first theoretical transmittance $t\_ori1_{rgb}$ of the first target image $ori1_{rgb}$ may satisfy:

$$t\_ori1_{rgb} = \left(\frac{ori1_{rgb}}{255}\right)^{2.2}. \qquad \text{Formula (21)}$$

The second theoretical transmittance $t\_ori2_{rgb}$ of the second target image $ori2_{rgb}$ may satisfy:

$$t\_ori2_{rgb} = \left(\frac{ori2_{rgb}}{255}\right)^{2.2}. \qquad \text{Formula (22)}$$

In step 3072, a first transmittance of the first display panel is determined based on the grayscale values of the respective pixels in the first display image, a first gamma parameter of the first display panel, the minimum output light brightness of the first display panel, and the maximum output light brightness of the first display panel.

In the embodiment of the present disclosure, before the first transmittance of the first display panel 103 is determined, the minimum output light brightness and the maximum output light brightness of the first display panel 103 may be acquired according to an experimental test. The minimum output light brightness of the first display panel 103 may be measured with a testing device when the grayscale values of the respective pixels in the first display panel 103 are 0 and the grayscale values of the respective pixels in the second display panel 104 are 255. The maximum output light brightness of the first display panel 103 may be measured with a testing device when the grayscale values of the respective pixels in the first display panel 103 are 255 and the grayscale values of the respective pixels in the second display panel 104 are 255.

Optionally, the first transmittance $t_{sub}$ of the first display panel 103 may satisfy:

$$t_{sub} = \left[\left(\frac{sub}{255}\right)^{\gamma 1} * (S_{max} - S_{min}) + S_{min}\right] \Big/ S_{max}. \qquad \text{Formula (23)}$$

In formula (23) above, sub is the first display image displayed by the first display panel 103, $S_{max}$ may be the maximum output light brightness of the first display panel 103, $S_{min}$ may be the minimum output light brightness of the first display panel 103, the first gamma parameter may be equal to 1, i.e., $\gamma 1=1$.

In step 3073, a second transmittance of a first panel region of the second display panel are determined based on the first theoretical transmittance, the first transmittance, and the updated grayscale values of the respective pixels in the first target image.

In the embodiment of the present disclosure, the first panel region may be configured to display the peripheral region sub-image in the second display image. The second transmittance of the first panel region may be positively correlated with the first theoretical transmittance, and negatively correlated with the first transmittance, and the updated grayscale values of the respective pixels in the first target image.

Optionally, the second transmittance tmain1(RGB) may satisfy:

$$tmainl(RGB) = \frac{t\_ori1_{rgb}}{t_{sub} * \left(\frac{lsiml}{255}\right)}. \qquad \text{Formula (24)}$$

In step 3074, a third transmittance of a second panel region of the second display panel is determined based on the second theoretical transmittance, the first transmittance, and the updated grayscale values of the respective pixels in the second target image.

In the embodiment of the present disclosure, the second panel region is at the center of the second display panel 104, the first panel region surrounds the second panel region, and the second panel region may be configured to display the central region sub-image. The third transmittance of the second panel region may be positively correlated with the second theoretical transmittance and negatively correlated with the first transmittance, and the updated grayscale values of the respective pixels in the second target image.

Optionally, the second transmittance tmainh(RGB) may satisfy:

$$tmainh(RGB) = \frac{t\_ori2_{rgb}}{t_{sub} * \left(\frac{lsimh}{255}\right)}. \qquad \text{Formula (25)}$$

In step 3075, grayscale values of respective pixels of the peripheral region sub-image are determined based on the second transmittance, a second gamma parameter of the second display panel, the minimum output light brightness of the second display panel, and the maximum output light brightness of the second display panel.

In the embodiment of the present disclosure, the minimum output light brightness and the maximum output light brightness of the second display panel 104 may be acquired according to an experimental test. The minimum output light brightness of the second display panel 104 may be measured with a testing device when the grayscale values of the respective pixels in the second display panel 104 are 0 and the grayscale values of the respective pixels in the first display panel 103 are 255. The maximum output light brightness of the second display panel 104 may be measured with a testing device when the grayscale values of the respective pixels in the second display panel 104 are 255 and the grayscale values of the respective pixels in the first display panel 103 are 255.

Optionally, the grayscale values main_l(RGB) of the respective pixels of the peripheral region sub-image of the second display image may satisfy:

$$\text{main\_l}(RGB) = \text{round}\left(\left[\frac{tmainl(RGB) * M_{max} - M_{min}}{M_{max} - M_{min}}\right]^{\frac{1}{\gamma 2}} * 255\right). \quad \text{Formula (26)}$$

In formula (26) above, $M_{max}$ may be the maximum output light brightness of the second display panel 104, $M_{min}$ may be the minimum output light brightness of the second display panel 104, the second gamma parameter γ2 may be equal to 2.2, i.e., γ2=2.2. Round( ) may be configured to rounding a function, and the round( ) function may round the value in the parentheses. If the determined grayscale value of certain pixel is main_l(RGB)>255, 255 is directly assigned to the grayscale value of the pixel.

In step 3076, grayscale values of respective pixels of the central region sub-image are determined based on the third transmittance, the second gamma parameter of the second display panel, the minimum output light brightness of the second display panel, and the maximum output light brightness of the second display panel.

Optionally, the grayscale values main_h(RGB) of the respective pixels of the central region sub-image of the second display image may satisfy:

$$\text{main\_h}(RGB) = \text{round}\left(\left[\frac{tmainh(RGB) * M_{max} - M_{min}}{M_{max} - M_{min}}\right]^{\frac{1}{\gamma 2}} * 255\right). \quad \text{Formula (27)}$$

In formula (27) above, if the determined grayscale value of certain pixel is main_h(RGB)>255, 255 is directly assigned to the grayscale value of the pixel.

In the embodiment of the present disclosure, as the central region sub-image is determined based on the updated second target image, the peripheral region sub-image is determined based on the updated first target image and the resolution of the updated second target image is greater than that of the updated first target image, the resolution of the central region sub-image may be greater than that of the peripheral region sub-image.

In step 308, for each of the backlight sources, the backlight source is driven to emit light based on the reference grayscale value of the backlight section where the backlight source is disposed.

In the embodiment of the present disclosure, the apparatus for displaying the image 101 may control the respective backlight sources 1021 in the backlight module 102 to emit light respectively and the brightness of the light emitted by the plurality of backlight sources 1021 may be the same or different. For each of the backlight sources 1021, the apparatus for displaying the image 101 may drive the backlight source 1021 to emit light based on the reference grayscale value of the backlight section, where the backlight source 1021 is disposed, determined according to step 302.

For each of the backlight sources 1021, the brightness of the light emitted by the backlight source 1021 may be positively correlated with the reference grayscale value of the backlight section where the backlight source 1021 is disposed. That is, for each of the backlight sources 1021, the larger the reference grayscale value of the backlight section where the backlight source 1021 is disposed is, the higher the brightness of the light emitted by the backlight source 1021 under the driving of the apparatus for displaying the image 101 is; and for each of the backlight sources 1021, the smaller the reference grayscale value of the backlight section where the backlight source 1021 is disposed is, the lower the brightness of the light emitted by the backlight source 1021 under the driving of the apparatus for displaying the image 101 is.

In the embodiment of the present disclosure, as the brightness of the light emitted by the backlight source 1021 may be correlated with the reference grayscale value of the backlight section where the backlight source 1021 is disposed and the reference grayscale value of the backlight section is correlated with the grayscale values of the respective pixels in the first image region corresponding to the backlight section, when driving the backlight source 1021 to emit light based on the reference grayscale value of the backlight section where the backlight source 1021 is disposed, the apparatus for displaying the image 101 can adjust the brightness of the light emitted by the plurality of backlight sources 1021 based on the brightness of the plurality of first image regions of the first target image, which makes a light portion of an image displayed by the display device lighter and a dark portion thereof darker. Thus, the image has a relatively higher contrast, and hence the display device has a better display effect.

In step 309, the first display panel is driven to perform display based on the first display image.

In the embodiment of the present disclosure, the apparatus for displaying the image 101 may drive the first display panel 103 to perform display based on the first display image. For example, the apparatus for displaying the image 101 may drive the first display panel 103 to display the first display image. As the first display panel 103 is the black-and-white display panel, the first display image displayed by the first display panel 103 may be a grayscale image.

In step 310, the second display panel is driven to perform display based on the second display image.

In the embodiment of the present disclosure, the apparatus for displaying the image 101 may drive the second display panel to perform display based on the grayscale values of the respective pixels in the second display image. For example, the apparatus for displaying the image 101 may drive the second display panel 101 to display the second display image. As the second display panel 104 is the color display panel, the second display image displayed by the second display panel 104 may be a color image.

Since the human vision only has a high resolution in the center of the eyes, rendering is performed with a high-resolution image (central region sub-image) in a central position of the display panel and rendering is performed with a low-resolution image (peripheral region sub-image)

in other position of the display panel, thereby increasing a computing speed of the image.

In step 311, positions of effective pixels of the first display panel are determined.

In the embodiment of the present disclosure, the size of the first display panel 103 may be greater than the size of the second display panel 104, and the number of pixels in the second display panel 104 may be an integer multiple of the number of pixels in the first display panel 103. However, as the size of the first display panel 103 and the size of the second display panel 104 are different, the first display panel 103 and the second display panel 104 may have different degrees of misalignment at different positions, which may affect the display effect of the display device.

Exemplarily, table 1 shows the size of the first display panel 103, the size of pixels in the panel and the resolution. In addition, table 1 also shows the size of the second display panel 104, the size of pixels in the panel and resolution.

TABLE 1

| Name | Size (mm) | Size of pixels in the panel (μm) | Resolution |
|---|---|---|---|
| Second display panel | 62.856 * 62.856 | 14.55 * 14.55 | 4320 * 4320 |
| First display panel | 63.468 * 63.468 | 88.15 * 88.15 | 720 * 720 |

Referring to table 1 above, it can be seen that the ratio of the size of the pixel in the first display panel 103 in the pixel row direction to the size of the pixel in the second display panel 104 in the pixel row direction may be equal to the ratio of the size of the pixel in the first display panel 103 in the pixel column direction to the size of the pixel in the second display panel 104 in the pixel column direction. However, as the total size of the first display panel 103 is different from the total size of the second display panel 104, the alignment of the first display panel 103 and the second display panel 104 is relatively accurate at a certain position, and the misalignment of the first display panel 103 and the second display panel 104 is more serious at a position farther from this alignment position.

Figure 10:
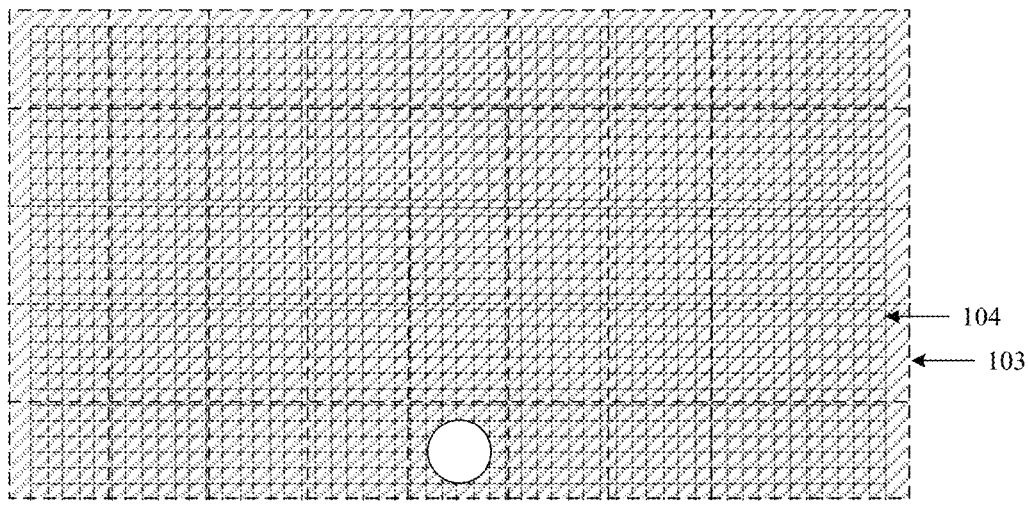
FIG. 10 is a diagram showing misalignment of a first display panel and a second display panel according to an embodiment of the present disclosure.

Exemplarily, referring to FIG. 10, the alignment of the first display panel 103 and the second display panel 104 is most accurate at the position of a circle mark and the misalignment of the first display panel 103 and the second display panel 104 is more serious at a position farther from this circle mark.

For avoiding a greater effect of the misalignment of the first display panel 103 and the second display panel 104 on the display effect of the display device, the grayscale values of the respective pixels in the first display image displayed by the first display panel 103 may be corrected or the grayscale values of the respective pixels in the second display image displayed by the second display panel 104 may be corrected.

As the first display panel 103 has a smaller number of pixels, the time for correcting the grayscale values of the respective pixels in the first display image displayed by the first display panel 103 may be relatively shorter. Thus, the embodiment of the present disclosure is described with an example that the first display image displayed by the first display panel 103 is corrected.

In the embodiment of the present disclosure, as the size of the first display panel 103 is greater than the size of the second display panel 104, the orthographic projection of the pixel disposed on the edge in the first display panel 103 on the second display panel 104 may not fall within the second display panel 104.

In this case, for ensuring the display effect of the display device, it needs to determine the positions of the effective pixels of the first display panel 103 and then display the image on the first display panel 103 based on the positions of the effective pixels. An orthographic projection of the effective pixel on the second display panel 104 falls within the second display panel 104.

In the embodiment of the present disclosure, the first display panel 103 may include a plurality of third panel regions in one-to-one correspondence with the plurality of backlight sections. The second display panel 104 includes a plurality of fourth panel regions in one-to-one correspondence with the plurality of backlight sections. The number of pixels of each fourth panel region in the second display panel 104 is greater than the number of pixels of each third panel region in the first display panel 103.

Figure 11:
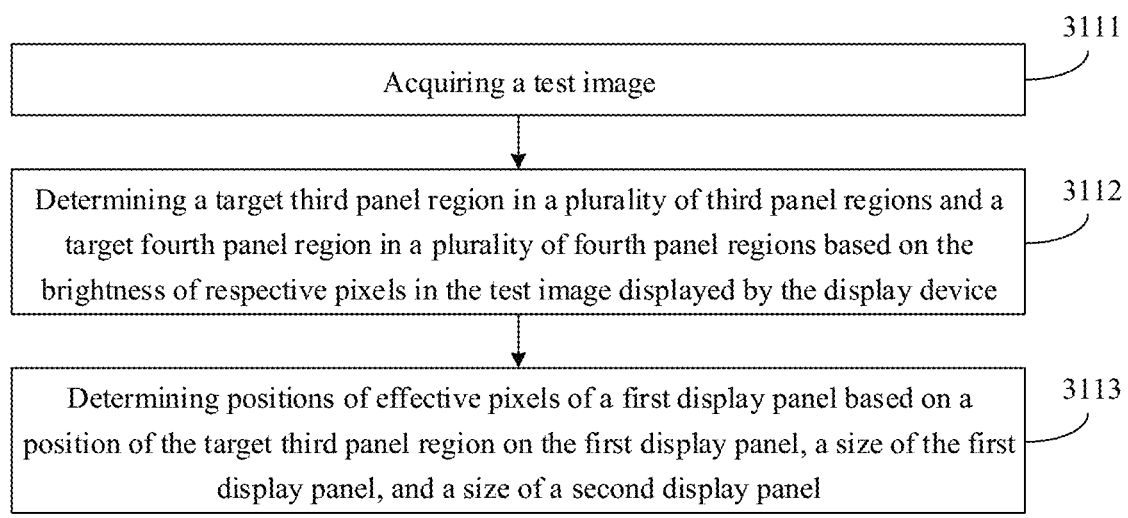
FIG. 11 is a flowchart of determining positions of effective pixels of the first display panel according to an embodiment of the present disclosure.

Referring to FIG. 11, step 311 may include the following steps.

In step 3111, a test image is acquired.

In the embodiment of the present disclosure, the display device may include a memory and the memory may store the test image therein. The apparatus for displaying the image 101 of the display device may acquire the test image from the memory. The test image may include a plurality of test patterns. Moreover, the plurality of test patterns may have the same shape. Of course, the plurality of test patterns may also have different shapes.

Figure 12:
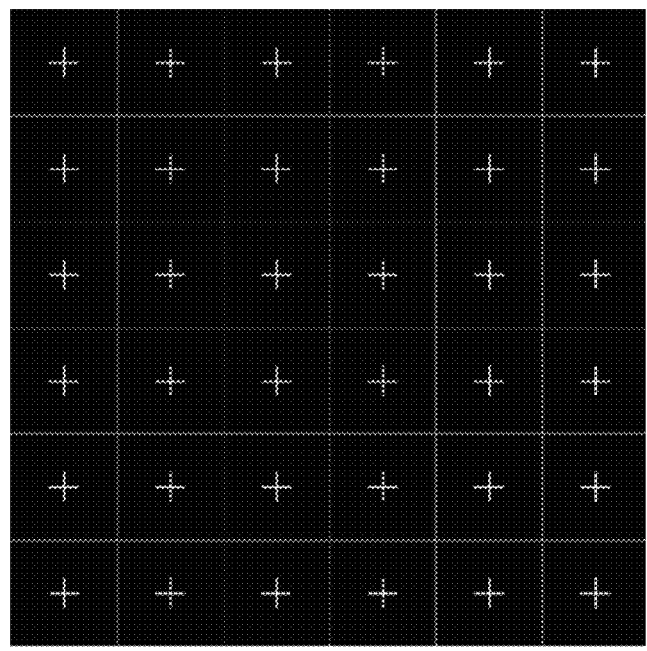
FIG. 12 is a diagram of a test image according to an embodiment of the present disclosure.

Referring to FIG. 12, each test pattern in the test image may be a cross-shaped pattern. Moreover, a pixel value of a region with the cross-shaped pattern in the test image may be 255, and the pixel value of other regions may be 0.

The cross-shaped pattern in the test image includes two bright lines perpendicular to each other and the width of each bright line may be adjusted according to the size of the pixel of the second display panel 104. For example, the width of each bright line may be equal to the width of three pixels in the second display panel 104.

In step 3112, a target third panel region in the plurality of third panel regions and a target fourth panel region in the plurality of fourth panel regions are determined based on the brightness of respective pixels in the test image displayed by the display device.

In the embodiment of the present disclosure, the apparatus for displaying the image 101 may determine the target third panel region and the target fourth panel region based on the brightness of the respective pixels in the test image displayed by the display device. The brightness of the test image displayed in the third panel region and the fourth panel region which are determined by the apparatus for displaying the image 101 may be higher than the brightness of the test image displayed in the other panel regions. Moreover, the alignment accuracy between the target third panel region and the target fourth panel region is greater than the alignment accuracy between another third panel region and the corresponding fourth panel region.

Optionally, there may be one or more target third panel regions and one or more target fourth panel regions which are determined by the apparatus for displaying the image 101. Moreover, the number of the determined target third panel regions and the number of the determined target fourth panel regions are the same.

Figure 13:
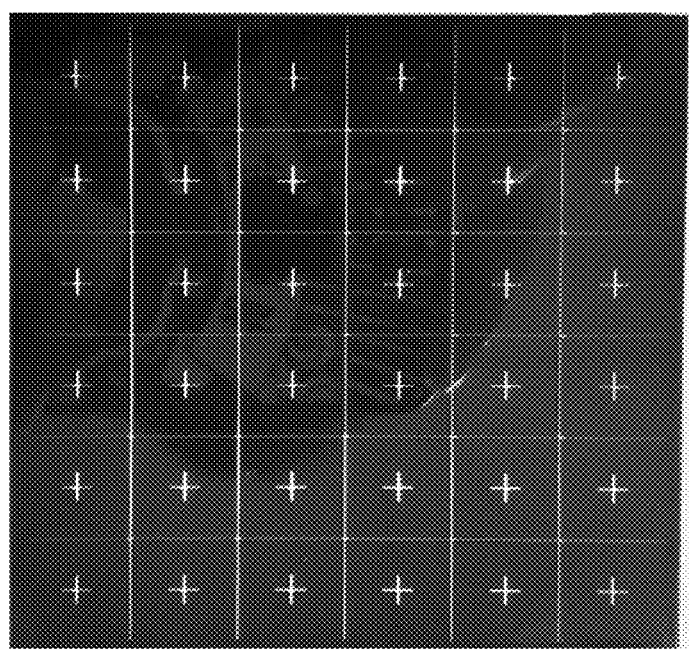
FIG. 13 is a diagram showing the effect of displaying the test image by the display device according to an embodiment of the present disclosure.

Referring to FIG. 13, the test image includes 6*6 test patterns and the apparatus for displaying the image 101 may determine that the brightness of the test pattern disposed in the sixth row and second column and the test pattern disposed in the sixth row and third column among the plurality of test patterns is highest. Thus, one target third panel region and one target fourth panel region may be determined based on the test pattern in the sixth row and second column, and one target third panel region and one target fourth panel region may be determined based on the test pattern in the sixth row and third column. That is, the apparatus for displaying the image 101 may determine two target third panel regions and two target fourth panel regions.

In step 3113, the positions of the effective pixels of the first display panel are determined based on a position of the target third panel region on the first display panel, the size of the first display panel, and the size of the second display panel.

In the embodiment of the present disclosure, the apparatus for displaying the image 101 may determine the position of the position, at which the alignment accuracy is highest, in the first display panel 103 along the pixel row direction and the pixel column direction based on the position of the determined target third panel region on the first display panel. Afterwards, the apparatus for displaying the image 101 may determine the size of the second display panel 104 as the effective size of the first display panel 103, and determine the number of the effective pixels in the first display panel 103 based on the effective size of the first display panel 103, and the first size of the pixel in the first display panel 103. Afterwards, the apparatus for displaying the image 101 may determine the positions of the effective pixels of the first display panel 103 based on the number of the effective pixels in the first display panel 103 by taking the position, at which the alignment accuracy is highest, as an origin of coordinates.

Exemplarily, according to step 3112 above, it may be determined that in the case that the test image includes 6*6 test patterns, the brightness of the test pattern disposed in the six row and second column and the test pattern disposed in the six row and third column are highest.

Thus, it may be determined that the alignment accuracy between the first display panel 103 and the second display panel 104 at a position between the test pattern in the six row and second column and the test pattern in the six row and third column is highest. Referring to FIG. 14, this position (origin of coordinates) is at ⅓ of the test image along the pixel row direction, and at the lowermost position of the test image.

The terms "upper left", "left", "upper", "right", and "upper right" shown in FIG. 14 are configured to indicate the deviation direction of the first display panel 103 relative to the second display panel. For example, the term "upper left" is configured to indicate that the first display panel 103 deviates to the upper left direction relative to the second display panel.

It is assumed that the size of the first display panel 103 is 63.468*63.468 mm, the size of the second display panel 104 is 62.856*62.856 mm, and the size of the first pixel in the first display panel 103 is 88.15*88.15 mm, the apparatus for displaying the image 101 may determine that the effective size of the first display panel 103 may be 62.856*62.856 mm. Afterwards, the apparatus for displaying the image 101 may determine that the number of the effective pixels in the first display panel 103 along the pixel row direction is 62.856±88.15 713 based on the effective size of the first display panel 103 and the size of the first pixel in the first display panel 103, and accordingly determine that the number of the effective pixels in the first display panel 103 along the pixel column direction is also 713. That is, the number of the effective pixels in the first display panel 103 may be 713*713. Moreover, the apparatus for displaying the image 101 may also determine that the number of actual pixels in the first display panel 103 is 720*720.

Afterwards, the apparatus for displaying the image 101 may determine that the effective pixels of the first display panel 103 include pixels in the $4^{th}$ column to the $716^{th}$ column and the $8^{th}$ row to the $720^{th}$ row in the first display panel based on the position, at which the alignment accuracy is highest, the number of the effective pixels in the first display panel 103 and the number of actual pixels in the first display panel 103.

In step 312, grayscale values of respective pixels in a third display image are determined based on a size relationship of a first size of the pixel in the first display panel and a second size of the pixel in the second display panel, and the grayscale values of the respective pixels in the second display image.

In the embodiment of the present disclosure, the alignment is the most accurate at the origin of the coordinates, and the misalignment is more serious at a position farther away from the origin of the coordinates. Moreover, at a position with certain distance from the origin of the coordinates, the misalignment size may be equal to the second size of one pixel in the second display panel 104 and this position may be regarded as a new position where the alignment is accurate.

Optionally, the size relationship of the first size of the pixel in the first display panel 103 and the second size of the pixel in the second display panel 104 may satisfy the total size n1*d1 of n1 pixels in the first display panel 103 is equal to the total size n2*d2 of n2 pixels in the second display panel 104, wherein d1 is the first size of each pixel in the first display panel 103 and d2 is the second size of each pixel in the second display panel 104.

Exemplarily, referring to table 1 above, the first size d1 of the pixel in the first display panel 103 is 88.15 μm and the second size d2 of the pixel in the second display panel 104 is 14.55 μm. The size relationship determined therefrom may be 17*d1≈103*d2. That is, the total size of 17 pixels in the first display panel 103 may be approximately equal to the total size of 103 pixels in the second display panel 104.

In the embodiment of the present disclosure, the apparatus for displaying the image 101 may determine, based on the grayscale values of the respective pixels in the second display image displayed by the second display panel 104, that grayscale values of pixels in the $(i+m)^{th}$ row in the third display image satisfy:

$$sub2(i+m, :) = \qquad \text{Formula (28)}$$
$$a1 * mean\left(main\left(\frac{i-x1}{n1} * n2 + c*m - (m-1) : \right.\right.$$
$$\left.\left.\frac{i-x1}{n1} * n2 + c*(m+1) - m, : \right)\right) +$$
$$b1 * max\left(main\left(\frac{i-x1}{n1} * n2 + c*m - (m-1) : \right.\right.$$
$$\left.\left.\frac{i-x1}{n1} * n2 + c*(m+1) - m, : \right)\right)$$

and determine that grayscale values of pixels in the $(j+m)^{th}$ column in the third display image satisfy:

$$sub3(:, j+m) = a1 * \text{mean} \left( \text{main}\left(:, \frac{j-y1}{n1} * n2 + c*m - (m-1): \frac{j-y1}{n1} * n2 + c*(m+1) - m \right) \right) + \quad \text{formula (29)}$$
$$b1 * \max \left( \text{main} \left(:, \frac{j-y1}{n1} * n2 + c*m - (m-1): \frac{j-y1}{n1} * n2 + c*(m+1) - m \right) \right).$$

In formula (28) and formula (29) above, i ranges from x1 to x2, the ratio of i−x1 to n1 is an integer, j ranges from y1 to y2, and the ratio of j−y1 to n1 is an integer; x1 is a row number of the first row of pixels in the effective pixels in the first display panel 103, and x2 is a row number of the last row of pixels in the effective pixels in the first display panel 103; y1 is a column number of the first column of pixels in the effective pixels in the first display panel 103, and y2 is a column number of the last column of pixels in the effective pixels in the first display panel 103. A1 is a weight coefficient of the average grayscale value and b is a weight coefficient of the maximum grayscale value. Mean( ) is configured to represent the average grayscale value, max( ) is configured to represent the maximum grayscale value, and c is configured to indicate that a grayscale value of one pixel in the third display image is determined by grayscale values of c pixels in the second display image.

Exemplarily, referring to table 1 above, the first size of the pixel in the first display panel 103 is 6.058 times of the second size of the pixel in the second display panel 104. Therefore, for ensuring the accuracy of the determined grayscale values of the respective pixels in the third display image, the grayscale value of one pixel in the third display image may be determined by the grayscale values of seven pixels in the second display image.

Moreover, it is assumed that the size relationship satisfies: 17*d1≈103*d2 and m is an integer greater than or equal to 0 and less than 17. The effective pixels of the first display panel 103 include pixels in the 4$^{th}$ column to the 716$^{th}$ column and the 8$^{th}$ row to the 720$^{th}$ row in the first display panel 103. That is, x1=8, x2=720, y1=4 and y2=716; i ranges from 8 to 720 and the ratio of i−8 to 17 is an integer; and j ranges from 4 to 716 and the ratio of j−4 to 17 is an integer. Thus, it may be determined from formula (28) above that the grayscale values of the pixels in the i$^{th}$ row in the third display image may satisfy:

$$sub2(i, :) = a1 * \text{mean}\left( \text{main}\left( \frac{i-8}{17} * 103 + 1: \frac{i-8}{17} * 103 + 7, : \right) \right) +$$
$$b1 * \max\left( \text{main}\left( \frac{i-8}{17} * 103 + 1: \frac{i-8}{17} * 103 + 7, : \right) \right).$$

It may be determined from formula (28) above that the grayscale values of the pixels in the (i+1)$^{th}$ row in the third display image may satisfy:

$$sub2(i+1, :) = a1 * \text{mean}\left( \text{main}\left( \frac{i-8}{17} * 103 + 7: \frac{i-8}{17} * 103 + 13, : \right) \right) +$$
$$b1 * \max\left( \text{main}\left( \frac{i-8}{17} * 103 + 7: \frac{i-8}{17} * 103 + 13, : \right) \right).$$

It may be determined from formula (28) above that the grayscale values of the pixels in the (i+2)$^{th}$ row in the third display image may satisfy:

$$sub2(i+2, :) = a1 * \text{mean}\left( \text{main}\left( \frac{i-8}{17} * 103 + 13: \frac{i-8}{17} * 103 + 19, : \right) \right) +$$
$$b1 * \max\left( \text{main}\left( \frac{i-8}{17} * 13 + 7: \frac{i-8}{17} * 103 + 19, : \right) \right).$$

By such analogy, it may be determined from formula (28) above that the grayscale values of the pixels in the (i+15)$^{th}$ row in the third display image may satisfy:

$$sub2(i+15, :) = a1 * \text{mean}\left( \text{main}\left( \frac{i-8}{17} * 103 + 91: \frac{i-8}{17} * 103 + 91, : \right) \right) +$$
$$b1 * \max\left( \text{main}\left( \frac{i-8}{17} * 13 + 91: \frac{i-8}{17} * 103 + 97, : \right) \right).$$

It may be determined from formula (28) above that the grayscale values of the pixels in the (i+16)$^{th}$ row in the third display image may satisfy:

$$sub2(i+16, :) = a1 * \text{mean}\left( \text{main}\left( \frac{i-8}{17} * 103 + 97: \frac{i-8}{17} * 103 + 103, : \right) \right) +$$
$$b1 * \max\left( \text{main}\left( \frac{i-8}{17} * 13 + 97: \frac{i-8}{17} * 103 + 103, : \right) \right).$$

Moreover, it may be determined from formula (29) above that the grayscale values of the pixels in the j$^{th}$ column in the third display image may satisfy:

$$sub3(:, j) = a1 * \text{mean}\left( \text{main}\left(:, \frac{j-4}{17} * 103 + 1: \frac{j-4}{17} * 103 + 7 \right) \right) +$$
$$b1 * \max\left( \text{main}\left(:, \frac{j-4}{17} * 103 + 1: \frac{j-4}{17} * 103 + 7 \right) \right).$$

It may be determined from formula (29) above that the grayscale values of the pixels in the (j+1)$^{th}$ column in the third display image may satisfy:

$$sub3(:, j+1) = a1 * \text{mean}\left( \text{main}\left(:, \frac{j-4}{17} * 103 + 7: \frac{j-4}{17} * 103 + 13. \right) \right) +$$
$$b1 * \max\left( \text{main}\left(:, \frac{j-4}{17} * 103 + 7: \frac{j-4}{17} * 103 + 13 \right) \right).$$

It may be determined from formula (29) above that the grayscale values of the pixels in the (j+2)$^{th}$ column in the third display image may satisfy:

$$sub3(:, j+2) = a1 * \text{mean}\left( \text{main}\left(:, \frac{j-4}{17} * 103 + 13: \frac{j-4}{17} * 103 + 19 \right) \right) +$$
$$b1 * \max\left( \text{main}\left(:, \frac{j-4}{17} * 103 + 13: \frac{j-4}{17} * 103 + 19 \right) \right).$$

By such analogy, it may be determined from formula (29) above that the grayscale values of the pixels in the (j+15)$^{th}$ column in the third display image may satisfy:

$$sub3(:, j+15) = a1 * \text{mean}\left(\text{main}\left(:, \frac{j-4}{17} * 103 + 91 : \frac{j-4}{17} * 103 + 97\right)\right) +$$
$$b1 * \text{max}\left(\text{main}\left(:, \frac{j-4}{17} * 103 + 91 : \frac{j-4}{17} * 103 + 97\right)\right).$$

It may be determined from formula (29) above that the grayscale values of the pixels in the $(j+16)^{th}$ column in the third display image may satisfy:

$$sub3(:, j+16) = a1 * \text{mean}\left(\text{main}\left(:, \frac{j-4}{17} * 103 + 97 : \frac{j-4}{17} * 103 + 103\right)\right) +$$
$$b1 * \text{max}\left(\text{main}\left(:, \frac{j-4}{17} * 103 + 97 : \frac{j-4}{17} * 103 + 103\right)\right).$$

In the embodiment of the present disclosure, the resolution of the third display image determined according to the above formula is 713*713. That is, the number of the pixels of the third display image is 713*713 and is the same as the number of the pixels of the effective display region of the first display panel 103.

In step 313, a fourth display image is acquired by performing second edge supplementing processing on the third display image based on the positions of the effective pixels of the first display panel.

As the resolution of the third display image acquired according to step 312 above is less than the first resolution of the first display panel 103, it needs to process the third display image, such that the resolution of the processed image (fourth display image) may be equal to the first resolution, which facilitates the display of the first display panel 103.

In the embodiment of the present disclosure, the apparatus for displaying the image 101 may acquire the fourth display image by performing second edge pixel supplementing processing on the third display image. The resolution of the fourth display image may be equal to the first resolution of the first display panel 103. The second edge pixel supplementing processing may be pixel filling processing for a region with an edge distal from the center in the third display image.

Optionally, the pixels of the third display image may be disposed in an initial region of the fourth display image, and the image disposed in the initial region in the fourth display image may be configured to be displayed in the effective display region of the first display panel 103.

Referring to FIG. 15, step 313 may include the following steps.

In step 3131, a plurality of fifth supplementing pixels are added to a side, distal from the center, of at least one row edge in the third display image, based on the positions of the effective pixels of the first display panel.

In the embodiment of the present disclosure, the apparatus for displaying the image 101 may determine which edge of the effective display region of the first display panel 103 that the fifth supplementary pixel needing to be added is disposed, based on the positions of the effective pixels of the first display panel 103.

If a lower edge of the effective display region of the first display panel 103 is overlapped with a lower edge of an actual display region of the first display panel 103, the apparatus for displaying the image 101 may add the fifth supplementing pixels to a side, distal from the center, of the upper edge in the third display image. If an upper edge of the effective display region of the first display panel 103 is overlapped with an upper edge of an actual display region of the first display panel 103, the apparatus for displaying the image 101 may add the fifth supplementing pixels to a side, distal from the center, of the lower edge in the third display image. If the upper edge of the effective display region of the first display panel 103 is not overlapped with the upper edge of the actual display region of the first display panel 103, and the lower edge of the effective display region of the first display panel 103 is not overlapped with the lower edge of the actual display region of the first display panel 103, the apparatus for displaying the image 101 may add the fifth supplementing pixels to the side, distal from the center, of the lower edge in the third display image, and the side, distal from the center, of the lower edge in the third display image.

A grayscale value of each of the fifth supplementing pixels is equal to a grayscale value of a seventh pixel, which is closest to the fifth supplementing pixel and disposed in the same column as the fifth supplementing pixel in the third display image.

Exemplarily, it is determined according to step 3113 above that the effective pixels of the first display panel 103 include pixels in the $4^{th}$ column to the $716^{th}$ column and the $8^{th}$ row to the $720^{th}$ row in the first display panel 103. That is, the lower edge of the effective display region of the first display panel 103 may be overlapped with the lower edge of the actual display region of the first display panel 103. Thus, the apparatus for displaying the image 101 may add the plurality of fifth supplementing pixels to the side, distal from the center, of the upper edge in the third display image.

In step 3132, a plurality of sixth supplementing pixels are added to a side, distal from the center, of at least one column edge in the third display image, based on the positions of the effective pixels of the first display panel.

In the embodiment of the present disclosure, the apparatus for displaying the image 101 may determine the positions of the sixth supplementing pixels needing to be added in the effective display region of the first display panel 103, based on the positions of the effective pixels of the first display panel 103.

If a left edge of the effective display region of the first display panel 103 is overlapped with a left edge of the actual display region of the first display panel 103, the apparatus for displaying the image 101 may add the sixth supplementing pixels to a side, distal from the center, of a right edge in the third display image. If a right edge of the effective display region of the first display panel 103 is overlapped with a right edge of an actual display region of the first display panel 103, the apparatus for displaying the image 101 may add the sixth supplementing pixels to a side, distal from the center, of a left edge in the third display image. If the left edge of the effective display region of the first display panel 103 is not overlapped with the left edge of the actual display region of the first display panel 103, and the right edge of the effective display region of the first display panel 103 is not overlapped with the right edge of the actual display region of the first display panel 103, the apparatus for displaying the image 101 may add the sixth supplementing pixels to the side, distal from the center, of a left edge in the third display image and the side, distal from the center, of the right edge in the third display image.

A grayscale value of each of the sixth supplementing pixels is equal to a grayscale value of an eighth pixel, which is closest to the sixth supplementing pixel and disposed in the same row as the sixth supplementing pixel in the third display image.

Exemplarily, it is determined according to step 3113 above that the effective pixels of the first display panel 103 include pixels in the 4$^{th}$ column to the 716$^{th}$ column and the 8$^{th}$ row to the 720$^{th}$ row in the first display panel 103. That is, the left edge of the effective display region of the first display panel 103 is not overlapped with the left edge of the actual display region of the first display panel 103, and the right edge of the effective display region of the first display panel 103 is not overlapped with the right edge of the actual display region of the first display panel 103. Thus, the apparatus for displaying the image 101 may add the plurality of sixth supplementing pixels to the side, distal from the center, of the left edge in the third display image and the side, distal from the center, of the right edge in the third display image.

In step 314, the fourth display image is displayed in the first display panel.

In the embodiment of the present disclosure, the apparatus for displaying the image 101 may drive the first display panel 103 to display the fourth display image determined in step 313 above.

Figure 16:
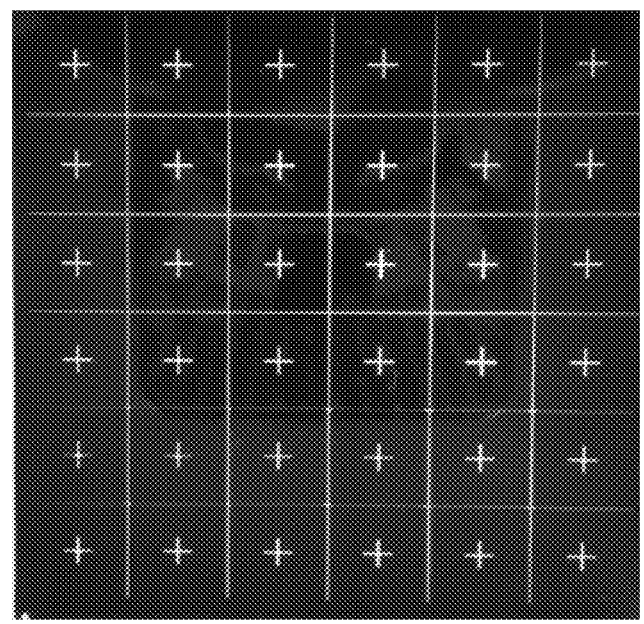
FIG. 16 is a diagram showing a display effect of the display device according to an embodiment of the present disclosure.

In the embodiment of the present disclosure, FIG. 13 shows the display effect of the display device when the first display image is displayed by the first display panel. FIG. 16 shows the display effect of the display device when the fourth display image is displayed by the first display panel. Referring to FIG. 13 and FIG. 16, it can be seen that when the fourth display image is displayed by the first display panel, the display effect of the display device is better and misalignment does not occur.

It should be noted that the order of steps of the method for displaying the image according to the embodiment of the present disclosure may be adjusted properly and the steps may also be correspondingly increased or decreased according to the situation. For example, step 305 and step 306 may be executed before step 303, step 308 to step 310 may be executed at the same time, and step 311 to step 314 may be deleted according to the actual situation. Change methods that would be readily conceived by any person skilled in the art within the scope of the technology disclosed in the present disclosure should be within the scope of protection of the present disclosure and thus will not be described herein.

In summary, in the method for displaying the image according to the embodiment of the present disclosure, the brightness of the light emitted by the plurality of backlight sources can be adjusted based on the brightness of the plurality of first image regions of the acquired first target image, which makes the light portion of the image displayed by the display device lighter and the dark portion thereof darker. Thus, the image has a relatively higher contrast, and the display device has the better display effect. Moreover, as the brightness of the light emitted by the backlight source may be adjusted flexibly through the method according to the present disclosure, the power consumption of the display device can be effectively reduced. In addition, through the method according to the present disclosure, on the premise of adjusting the brightness of the backlight source, the image displayed by the first display panel and the image displayed by the second display panel can be controlled respectively, and thus the display effect of the display device can be further ensured.

Figure 17:
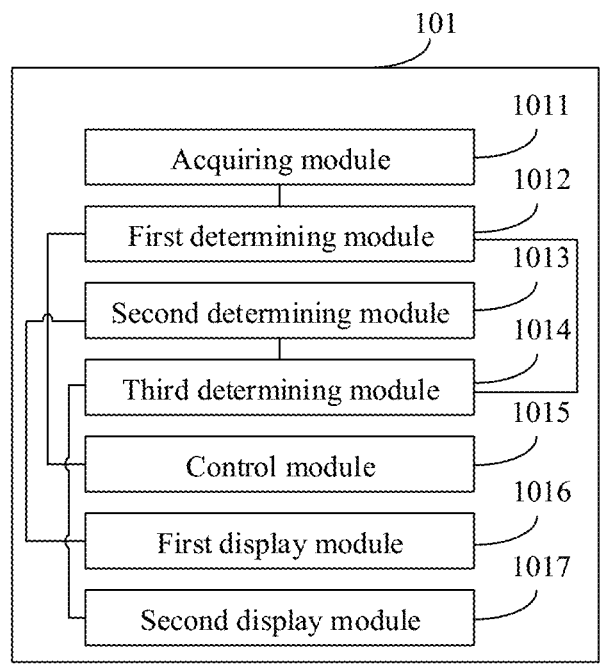
FIG. 17 is a structural diagram of an apparatus for displaying an image of the display device according to an embodiment of the present disclosure.

FIG. 17 is a structural diagram of an apparatus for displaying an image according to an embodiment of the present disclosure. Referring to FIG. 17, it can be seen that the apparatus for displaying the image 101 may include:

an acquiring module 1011, configured to acquire a first target image with a third resolution and a second target image with a fourth resolution, wherein both the third resolution and the fourth resolution are less than a second resolution of a second display panel 104 of a display device, the second display panel is a color display pane, and the first target image includes a plurality of first image regions in one-to-one correspondence with a plurality of backlight sections;

a first determining module 1012, configured to determine a reference grayscale value of each of the backlight sections based on grayscale values of respective pixels in the first image region corresponding to the backlight section, wherein the reference grayscale value is positively correlated with grayscale values of respective pixels in the first image region;

a second determining module 1013, configured to determine grayscale values of respective pixels in a first display image based on grayscale values of respective pixels in the first target image, wherein a resolution of the first display image is equal to a first resolution of a first display panel of the display device, and the first resolution is less than the second resolution;

a third determining module 1014, configured to determine grayscale values of respective pixels in a second display image based on the grayscale values of the respective pixels in the first target image, grayscale values of respective pixels in the second target image, the reference grayscale values of the plurality of backlight sections, and the grayscale values of the respective pixels in the first display image;

a control module 1015, configured to drive each of the backlight sources to emit light based on the reference grayscale value of the backlight section where the backlight source is disposed;

a first display module 1016, configured to drive the first display panel to perform display based on the first display image; and a second display module 1017, configured to drive the second display panel to perform display based on the second display image.

Optionally, the first determining module 1012 may be configured to for each of the backlight sections, determine the reference grayscale value of the backlight section based on a maximum grayscale value of the respective pixels in the first image region corresponding to the backlight section. The reference grayscale value is positively correlated with the maximum grayscale value.

Optionally, the first determining module 1012 may also be configured to determine the reference grayscale value of the backlight section based on the maximum grayscale value and an average grayscale value of the respective pixels in the first image region corresponding to the backlight section. The reference grayscale value is further positively correlated with the average grayscale value.

Optionally, the first determining module 1012 is configured to acquire a plurality of initial reference grayscale values by determining, for each of the backlight sections, the initial reference grayscale value of the backlight section based on the grayscale values of the respective pixels in the first image region corresponding to the backlight section; and determine the reference grayscale value of each of the backlight sections based on a target initial reference grayscale value of a target backlight section of the plurality of backlight sections. The target backlight section is disposed at the center of the plurality of backlight sections.

Figure 18:
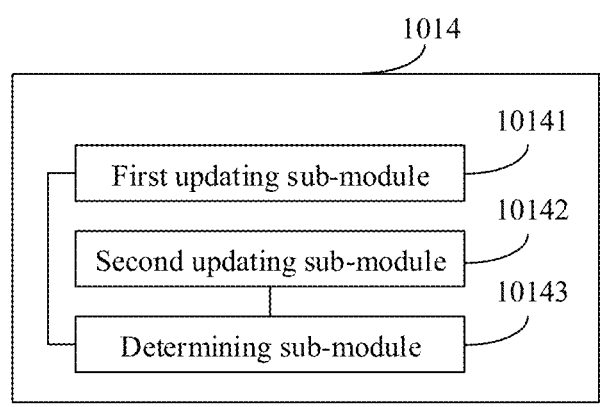
FIG. 18 is a structural diagram of a third determining module according to an embodiment of the present disclosure.

Optionally, referring to FIG. 18, the third determining module 1014 may include:

a first updating sub-module 10141 configured to update the grayscale values of the respective pixels in the first target image based on the reference grayscale values of the plurality of backlight sections;

a second updating sub-module 10142 configured to update the grayscale values of the respective pixels in the second target image based on the reference grayscale values of the plurality of backlight sections; and a determining sub-module 10143 configured to determine the grayscale values of the respective pixels in the second display image based on the grayscale values and updated grayscale values of the respective pixels in the first target image, the grayscale values and updated grayscale values of the respective pixels in the second target image, and the grayscale values of the respective pixels in the first display image.

Optionally, the first updating sub-module 10141 may be configured to:

for each first pixel in each of the first image regions, determine a distance between the first pixel and each of at least one first target backlight section;

determine a light-splitting weight of light emitted by the at least one first target backlight section to the first pixel based on the distance between the first pixel and each first target backlight section; and update the grayscale value of the first pixel based on a reference grayscale value of the at least one first target backlight section and the light-splitting weight of the light emitted by each first target backlight section to the first pixel.

The at least one first target backlight section includes a backlight section corresponding to the first image region where the first pixel is disposed, and a backlight region, a distance between which and the backlight section corresponding to the first image region where the first pixel is disposed is less than a distance threshold.

Optionally, the first updating sub-module 10141 may also be configured to:

for each of the first pixels, acquire the light-splitting weight of each first target backlight section to the first pixel by calculating the distance between the first pixel and each first target backlight section with a first point diffusion curve algorithm.

The at least one first target backlight section includes the backlight section corresponding to the first image region where the first pixel is disposed, and a backlight region in an F1*F2 neighborhood of the backlight section corresponding to the first image region where the first pixel is disposed, F1 and F2 being integers greater than 1.

Optionally, the second updating sub-module 10142 may be configured to:

for each second pixel in each of second image regions, determine a distance between the second pixel and each of at least one second target backlight section;

determine a light-splitting weight of light emitted by the at least one second target backlight section to the second pixel based on the distance between the second pixel and each second target backlight section; and update the grayscale value of the second pixel based on a reference grayscale value of at least one first image region corresponding to the at least one second target backlight section and the light-splitting weight of the light emitted by each second target backlight section to the second pixel.

The at least one second target backlight section includes a backlight section corresponding to the second image region where the second pixel is disposed, and a backlight region, a distance between which and the backlight section corresponding to the second image region where the second pixel is disposed is less than a distance threshold.

Optionally, the second updating sub-module 10142 may also be configured to:

for each of the second pixels, acquire the light-splitting weight of each second target backlight section to the second pixel by calculating the distance between the second pixel and each second target backlight section with a second point diffusion curve algorithm.

The at least one second target backlight section includes the backlight section corresponding to the second image region where the second pixel is disposed, and a backlight region in an F1*F2 neighborhood of the backlight section corresponding to the second image region where the second pixel is disposed, F1 and F2 being integers greater than 1.

Optionally, the second display image includes a central region sub-image and a peripheral region sub-image surrounding the central region sub-image. The first determining sub-module 10143 may also be configured to:

determine a first theoretical transmittance of the first target image and a second theoretical transmittance of the second target image;

determine a first transmittance of the first display panel based on the grayscale values of the respective pixels in the first display image, a first gamma parameter of the first display panel, minimum output light brightness of the first display panel, and maximum output light brightness of the first display panel;

determine a second transmittance of a first panel region of the second display panel based on the first theoretical transmittance, the first transmittance, and the updated grayscale values of the respective pixels in the first target image;

determine a third transmittance of a second panel region of the second display panel based on the second theoretical transmittance, the first transmittance, and the updated grayscale values of the respective pixels in the second target image, wherein the second panel region is disposed at a center of the second display panel and configured to display the central region sub-image, and the first panel region is surrounded the second panel region and configured to display the peripheral region sub-image;

determine grayscale values of respective pixels of the peripheral region sub-image based on the second transmittance, a second gamma parameter of the second display panel, minimum output light brightness of the second display panel, and maximum output light brightness of the second display panel; and determine grayscale values of respective pixels of the central region sub-image based on the third transmittance, the second gamma parameter of the second display panel, the minimum output light brightness of the second display panel, and the maximum output light brightness of the second display panel.

Optionally, the first gamma parameter is equal to 1 and the second gamma parameter is equal to 2.2.

Figure 19:
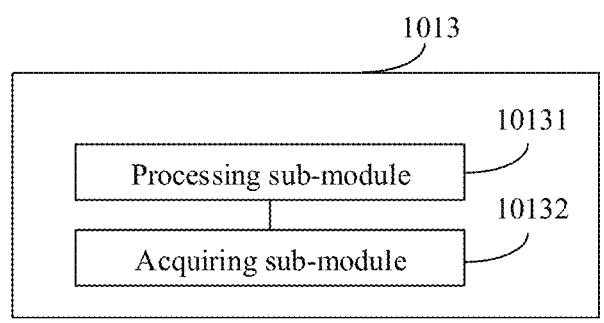
FIG. 19 is a structural diagram of a second determining module according to an embodiment of the present disclosure.

Optionally, referring to FIG. 19, the second determining module 1013 may include:

a processing sub-module 10131 configured to acquire an initial image with a fifth resolution by processing the first target image with a bilinear interpolation algorithm, wherein the fifth resolution is less than the first resolution; and an acquiring sub-module 10132 configured to acquire the first display image by performing first edge pixel supplementing processing on the initial image, wherein the first edge pixel supplementing processing is pixel filling processing for a region with an edge distal from a center in the initial image.

Optionally, the first acquiring sub-module 10132 may also be configured to:

add a plurality of first supplementing pixels to a side, distal from the center, of a first edge in the initial image, wherein a grayscale value of each of the first supplementing pixels is equal to a grayscale value of a third pixel, which is disposed in the same column as the first supplementing pixel, in the first edge;

add a plurality of second supplementing pixels to a side, distal from the center, of a second edge in the initial image, wherein a grayscale value of each of the second supplementing pixels is equal to a grayscale value of a fourth pixel, which is disposed in the same column as the second supplementing pixel, in the second edge;

add a plurality of third supplementing pixels to a side, distal from the center, of a third edge in the initial image, wherein a grayscale value of each of the third supplementing pixels is equal to a grayscale value of a fifth pixel, which is disposed in the same row as the third supplementing pixel, in the third edge; and add a plurality of fourth supplementing pixels to a side, distal from the center, of a fourth edge in the initial image, wherein a grayscale value of each of the fourth supplementing pixels is equal to a grayscale value of a sixth pixel, which is disposed in the same row as the fourth supplementing pixel, in the fourth edge, wherein both the first edge and the second edge are parallel to a pixel row direction, and both the third edge and the fourth edge are parallel to a pixel column direction.

Figure 20:
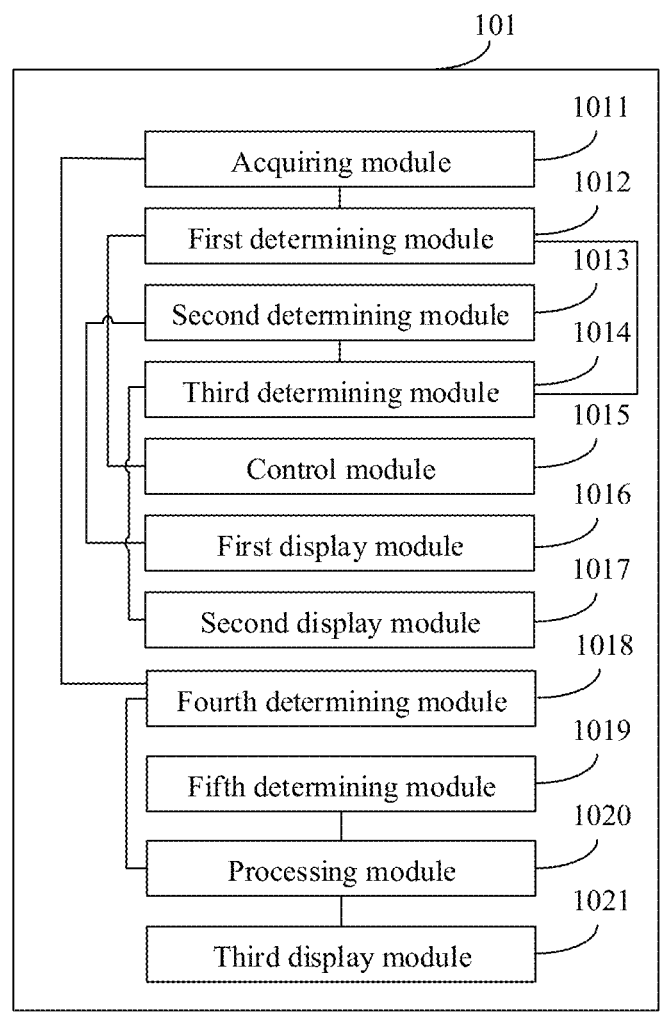
FIG. 20 is a structural diagram of an apparatus for displaying an image of the display device according to another embodiment of the present disclosure.

Optionally, a size of the first display panel is greater than a size of the second display panel, and a number of pixels in the second display panel is an integer multiple of a number of pixels in the first display panel. Referring to FIG. 20, the apparatus for displaying the image 101 may also include:

a fourth determining module 1018 which may be configured to determine positions of effective pixels of the first display panel, wherein an orthographic projection of the effective pixel on the second display panel is disposed within the second display panel;

a fifth determining module 1019 which may be configured to determine grayscale values of respective pixels in a third display image based on a size relationship of a first size of the pixel in the first display panel and a second size of the pixel in the second display panel, and the grayscale values of the respective pixels in the second display image; and a processing module 1020 which may be configured to acquire a fourth display image by performing second edge supplementing processing on the third display image based on the positions of the effective pixels of the first display panel, wherein the second edge pixel supplementing processing is pixel filling processing for a region with an edge distal from the center in the third display image; and a third display module 1021 which may be configured to display the fourth display image in the first display panel.

Optionally, the processing module 1020 may be configured to:

add a plurality of fifth supplementing pixels to a side, distal from the center, of at least one row edge in the third display image based on the positions of the effective pixels of the first display panel, wherein a grayscale value of each of the fifth supplementing pixels is equal to a grayscale value of a seventh pixel, which is closest to the fifth supplementing pixel and disposed in the same column as the fifth supplementing pixel in the third display image; and add a plurality of sixth supplementing pixels to a side, distal from the center, of at least one column edge in the third display image based on the positions of the effective pixels of the first display panel, wherein a grayscale value of each of the sixth supplementing pixels is equal to a grayscale value of an eighth pixel, which is closest to the sixth supplementing pixel and disposed in the same row as the sixth supplementing pixel in the third display image.

Optionally, grayscale values of pixels in the $(i+m)^{th}$ row in the third display image satisfy:

$$sub1(i+m,\ :) = a1 * \text{mean}$$

$$\left(\text{main}\left(:,\ \frac{i-x1}{n1}*n2+c*m-(m-1):\frac{i-x1}{n1}*n2+c*(m+1)-m,\ :\right)\right)+b$$

$$1*\max$$

$$\left(\text{main}\left(:,\ \frac{i-x1}{n1}*n2+c*m-(m-1):\frac{i-x1}{n1}*n2+c*(m+1)-m,\ :\right)\right)$$

Grayscale values of pixels in the $(j+m)^{th}$ column in the third display image satisfy:

$$sub2(:,\ j+m) = a1 * \text{mean}$$

$$\left(\text{main}\left(:,\ \frac{j-y1}{n1}*n2+c*m-(m-1):\frac{j-y1}{n1}*n2+c*(m+1)-m\right)\right)+b1*$$

$$\max\left(\text{main}\left(:,\ \frac{j-y1}{n1}*n2+c*m-(m-1):\frac{j-y1}{n1}*n2+c*(m+1)-m\right)\right)$$

The size relationship satisfies: a total size n1*d1 of n1 pixels in the first display panel is equal to a total size n2*d2 of n2 pixels in the second display panel, d1 is the first size of each pixel in the first display panel, and d2 is the second size of each pixel in the second display panel.

Wherein i ranges from x1 to x2, a ratio of i−x1 to n1 is an integer, j ranges from y1 to y2, and a ratio of j−y1 to n1 is an integer. X1 is a row number of a first row of pixels in the effective pixels in the first display panel, x2 is a row number of a last row of pixels in the effective pixels in the first display panel, y1 is a column number of a first column of pixels in the effective pixels in the first display panel, and y2 is a column number of a last column of pixels in the effective pixels in the first display panel.

Wherein a is a weight coefficient of an average grayscale value and b is a weight coefficient of a maximum grayscale value. Mean( ) is configured to represent the average grayscale value, max( ) is configured to represent the maximum grayscale value, and c is configured to indicate that a grayscale value of one pixel in the third display image is determined by grayscale values of c pixels in the second display image.

Optionally, the first display panel includes a plurality of third panel regions which are in one-to-one correspondence with the plurality of backlight sections; and the second display panel includes a plurality of fourth panel regions which are in one-to-one correspondence with the plurality of backlight sections. The fourth determining module 1018 may be configured to:
- acquire a test image;
- determine a target third panel region in the plurality of third panel regions and a target fourth panel region in the plurality of fourth panel regions based on brightness of respective pixels in the test image displayed by the display device, wherein an alignment accuracy between the target third panel region and the target fourth panel region is greater than the alignment accuracy between another third panel region and the corresponding fourth panel region; and
- determine the positions of the effective pixels of the first display panel based on a position of the target third panel region on the first display panel, the size of the first display panel, and the size of the second display panel.

Optionally, the test image includes a plurality of test patterns; and the brightness of the test patterns displayed in the target third panel region and the target fourth panel region is higher than the brightness of the test patterns displayed in the other panel regions.

In the embodiment of the present disclosure, the apparatus for displaying the image 101 may be a processor or a driving chip.

In summary, the apparatus for displaying the image according to the embodiment of the present disclosure can adjust the brightness of the light emitted by the plurality of backlight sources based on the brightness of the plurality of first image regions of the acquired first target image, which makes the light portion of the image displayed by the display device lighter and the dark portion thereof darker. Thus, the image has a relatively higher contrast, and the display device has the better display effect. Moreover, as the apparatus for displaying the image according to the embodiment of the present disclosure can adjust flexibly the brightness of the light emitted by the backlight source, the power consumption of the display device can be effectively reduced. In addition, the apparatus for displaying the image according to the embodiment of the present disclosure can control respectively the image displayed by the first display panel and the image displayed by the second display panel on the premise of adjusting the brightness of the backlight source, and thus the display effect of the display device can be further ensured.

Figure 21:
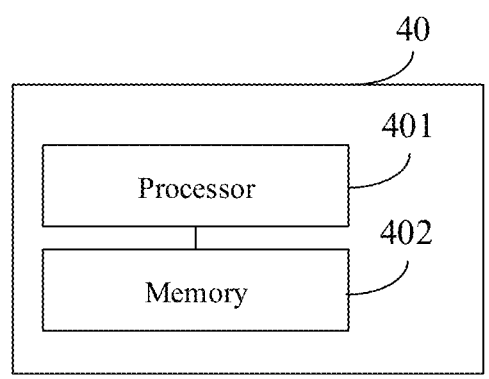
FIG. 21 is a structural diagram of a computer device according to an embodiment of the present disclosure.

FIG. 21 is a structural diagram of a computer device according to an embodiment of the present disclosure. Referring to FIG. 21, it can be seen that the computer device 40 may include a processor 401 and a memory 402. The memory 402 may be configured to store at least one computer program. The processor 401, when executing the computer program stored in the memory 402, is caused to perform the method for displaying the image according to the above embodiment.

An embodiment of the present disclosure further provides a computer-readable storage medium. The computer-readable storage medium stores at least one instruction therein, wherein the at least one instruction, when loaded and executed by a processor, causes the processor to perform the method for displaying the image according to the above embodiment.

Figure 22:
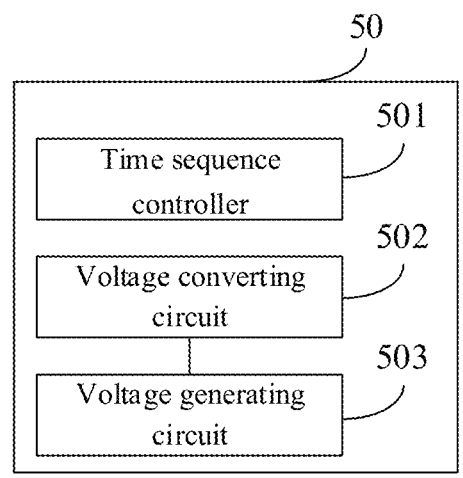
FIG. 22 is a structural diagram of a screen driving board according to an embodiment of the present disclosure.

FIG. 22 is a structural diagram of a screen driving board according to an embodiment of the present disclosure. Referring to FIG. 22, it can be seen that the screen driving board 50 includes a time sequence controller 501, a voltage converting circuit 502 and a voltage generating circuit 503. The voltage converting circuit 502 is connected to the voltage generating circuit 503.

The time sequence controller 501 is configured to determine grayscale values of respective pixels in a first display image and grayscale values of respective pixels in a second display image according to the method for displaying the image according to the above embodiment and based on a first target image and a second target image, and generate a time sequence control signal of a first display panel and a time sequence control signal of a second display panel.

The voltage converting circuit 502 is configured to generate a reference voltage signal and a row driving signal based on a power source.

The voltage generating circuit 503 is configured to generate a driving voltage required by the grayscale values of the respective pixels in the first display image and a driving voltage required by the grayscale values of the respective pixels in the second display image based on the reference voltage signal.

The time sequence control signal of the first display panel and the row driving signal are provided to a row driving circuit of the first display panel. The time sequence control signal of the second display panel and the row driving signal are provided to a row driving circuit of the second display panel. The grayscale values of the respective pixels in the first display image, the time sequence control signal of the first display panel, and the driving voltage required by the grayscale values of the respective pixels in the first display image are provided to a column driving circuit of the first display panel. The grayscale values of the respective pixels in the second display image, the time sequence control signal of the second display panel, and the driving voltage required by the grayscale values of the respective pixels in the second display image are provided to a column driving circuit of the second display panel.

The terms "first", "second", "third", "fourth", "fifth", "sixth", "seventh" and "eighth" in the embodiment of the present disclosure are merely for the purpose of description and should not be construed as indicating or implying relative importance. The term "at least one" in the embodiment of the present disclosure means one or more, and the term "a plurality of" in the embodiment of the present disclosure means two or more.

The above description is only optional embodiments of the present disclosure, and is not intended to limit the present disclosure. Any modifications, equivalent replacements, improvements and the like made within the spirit and principles of the present disclosure should be included within the scope of protection of the present disclosure.

What is claimed is:

1. A method for displaying an image, applicable to an apparatus for displaying an image of a display device, wherein the display device comprises a backlight module, a first display panel, and a second display panel that are laminated sequentially, wherein the backlight module comprises a plurality of backlight sections arranged in an array and a plurality of backlight sources, each of the backlight sections being provided with at least one of the backlight sources, and wherein the first display panel comprises a black-and-white display panel of a first resolution and includes a plurality of first display panel regions which are in one-to-one correspondence with the plurality backlight sections, and the second display panel comprises a color display panel of a second resolution and includes a plurality of second display panel regions which are in one-to-one correspondence with the plurality backlight sections, wherein the first resolution being less than the second resolution; and the method comprises:

acquiring a first target image with a third resolution and a second target image with a fourth resolution based on a source image and acquiring grayscale values of respective pixels in the first target image and grayscale values of respective pixels in the second target image, wherein both the third resolution and the fourth resolution are less than the second resolution, and the first target image comprises a plurality of first image regions in one-to-one correspondence with the plurality of backlight sections;

determining a reference grayscale value of each of the backlight sections based on the grayscale values of respective pixels in the first image region corresponding to the backlight section;

determining grayscale values of respective pixels in a first display image based on the grayscale values of respective pixels in the first target image, wherein a resolution of the first display image is the first resolution;

determining grayscale values of respective pixels in a second display image based on the grayscale values of the respective pixels in the first target image, the grayscale values of respective pixels in the second target image, the reference grayscale values of the plurality of backlight sections, and the grayscale values of the respective pixels in the first display image; driving each of the backlight sources to emit light based on the reference grayscale value of the backlight section where the backlight source is disposed;

driving the first display panel to perform display based on the grayscale values of respective pixels in the first display image; and driving the second display panel to perform display based on the grayscale values of respective pixels in the second display image.

2. The method according to claim 1, wherein determining the reference grayscale value of each of the backlight sections based on the grayscale values of the respective pixels in the first image region corresponding to the backlight section comprises:

for each of the backlight sections, determining the reference grayscale value of the backlight section based on a maximum grayscale value of the respective pixels in the first image region corresponding to the backlight section, wherein the reference grayscale value is positively correlated with the maximum grayscale value.

3. The method according to claim 2, wherein determining the reference grayscale value of the backlight section based on the maximum grayscale value of the respective pixels in the first image region corresponding to the backlight section comprises:

determining the reference grayscale value of the backlight section based on the maximum grayscale value and an average grayscale value of the respective pixels in the first image region corresponding to the backlight section, wherein the reference grayscale value is further positively correlated with the average grayscale value.

4. The method according to claim 1, wherein determining the reference grayscale value of each of the backlight sections based on the grayscale values of the respective pixels in the first image region corresponding to the backlight section comprises:

acquiring a plurality of initial reference grayscale values by determining, for each of the backlight sections, the initial reference grayscale value of the backlight section based on the grayscale values of the respective pixels in the first image region corresponding to the backlight section; and determining the reference grayscale value of each of the backlight sections based on a target initial reference grayscale value of a target backlight section of the plurality of backlight sections, wherein the target backlight section is disposed at a center of the plurality of backlight sections.

5. The method according to claim 1, wherein determining the grayscale values of the respective pixels in the second display image based on the grayscale values of the respective pixels in the first target image, the grayscale values of the respective pixels in the second target image, the reference grayscale values of the plurality of backlight sections, and the grayscale values of the respective pixels in the first display image comprises:

updating the grayscale values of the respective pixels in the first target image based on the reference grayscale values of the plurality of backlight sections;

updating the grayscale values of the respective pixels in the second target image based on the reference grayscale values of the plurality of backlight sections; and determining the grayscale values of the respective pixels in the second display image based on the grayscale values and updated grayscale values of the respective pixels in the first target image, the grayscale values and updated grayscale values of the respective pixels in the second target image, and the grayscale values of the respective pixels in the first display image.

6. The method according to claim 5, wherein updating the grayscale values of the respective pixels in the first target image based on the reference grayscale values of the plurality of backlight sections comprises:

for each first pixel in each of the first image regions, determining a distance between the first pixel and each of at least one first target backlight section, wherein the at least one first target backlight section comprises a backlight section corresponding to the first image region where the first pixel is disposed, and a backlight region, a distance between which and the backlight section corresponding to the first image region where the first pixel is disposed is less than a distance threshold;

determining a light-splitting weight of light emitted by the at least one first target backlight section to the first pixel based on the distance between the first pixel and each first target backlight section; and updating the grayscale value of the first pixel based on a reference grayscale value of the at least one first target backlight section and the light-splitting weight of the light emitted by each first target backlight section to the first pixel.

7. The method according to claim 6, wherein determining the light-splitting weight of the light emitted by the at least one first target backlight section to the first pixel based on the distance between the first pixel and each first target backlight section comprises:

for each of the first pixels, acquiring the light-splitting weight of each first target backlight section to the first pixel by calculating the distance between the first pixel and each first target backlight section with a first point diffusion curve algorithm, wherein the at least one first target backlight section comprises the backlight section corresponding to the first image region where the first pixel is disposed, and a backlight region in a F1*F2 neighborhood of the backlight section corresponding to the first image region where the first pixel is disposed, F1 and F2 being integers greater than 1.

8. The method according to claim 5, wherein the second target image comprises a plurality of second image regions in one-to-one correspondence with the plurality of backlight sections; and updating the grayscale values of the respective pixels in the second target image based on the reference grayscale values of the plurality of backlight sections comprises:

for each second pixel in each of the second image regions, determining a distance between the second pixel and each of at least one second target backlight section, wherein the at least one second target backlight section comprises a backlight section corresponding to the second image region where the second pixel is disposed, and a backlight region, a distance between which and the backlight section corresponding to the second image region where the second pixel is disposed is less than a distance threshold;

determining a light-splitting weight of light emitted by the at least one second target backlight section to the second pixel based on the distance between the second pixel and each second target backlight section; and updating the grayscale value of the second pixel based on a reference grayscale value of the at least one second target backlight section and the light-splitting weight of the light emitted by each second target backlight section to the second pixel.

9. The method according to claim 8, wherein determining the light-splitting weight of the light emitted by the at least one second target backlight section to the second pixel based on the distance between the second pixel and each second target backlight section comprises:

for each of the second pixels, acquiring the light-splitting weight of each second target backlight section to the second pixel by calculating the distance between the second pixel and each second target backlight section with a second point diffusion curve algorithm, wherein the at least one second target backlight section comprises the backlight section corresponding to the second image region where the second pixel is disposed, and a backlight region in an F1*F2 neighborhood of the backlight section corresponding to the second image region where the second pixel is disposed, F1 and F2 being integers greater than 1.

10. The method according to claim 5, wherein the second display image comprises a central region sub-image and a peripheral region sub-image surrounding the central region sub-image; and determining the grayscale values of the respective pixels in the second display image based on the grayscale values of the respective pixels in the first target image, the grayscale values of the respective pixels in the second target image, the reference grayscale values of the plurality of backlight sections, and the grayscale values of the respective pixels in the first display image comprises:

determining a first theoretical transmittance of the first target image and a second theoretical transmittance of the second target image;

determining a first transmittance of the first display panel based on the grayscale values of the respective pixels in the first display image, a first gamma parameter of the first display panel, minimum output light brightness of the first display panel, and maximum output light brightness of the first display panel;

determining a second transmittance of a first panel region, in the plurality of second display panel regions of the second display panel, based on the first theoretical transmittance, the first transmittance, and the updated grayscale values of the respective pixels in the first target image;

determining a third transmittance of a second panel region in the plurality of second display panel regions of the second display panel based on the second theoretical transmittance, the first transmittance, and the updated grayscale values of the respective pixels in the second target image, wherein the second panel region is disposed at a center of the second display panel and configured to display the central region sub-image, and the first panel region surrounds the second panel region and configured to display the peripheral region sub-image;

determining grayscale values of respective pixels of the peripheral region sub-image based on the second transmittance, a second gamma parameter of the second display panel, minimum output light brightness of the second display panel, and maximum output light brightness of the second display panel; and determining grayscale values of respective pixels of the central region sub-image based on the third transmittance, the second gamma parameter of the second display panel, the minimum output light brightness of the second display panel, and the maximum output light brightness of the second display panel.

11. The method according to claim 1, wherein determining the grayscale values of the respective pixels in the first display image based on the grayscale values of the respective pixels in the first target image comprises:

acquiring an initial image with a fifth resolution by processing the first target image with a bilinear interpolation algorithm, wherein the fifth resolution is less than the first resolution; and acquiring the first display image by performing first edge pixel supplementing processing on the initial image, wherein the first edge pixel supplementing processing is pixel filling processing for a region with an edge distal from a center in the initial image.

12. The method according to claim 11, wherein performing first edge pixel supplementing processing on the initial image comprises:

adding a plurality of first supplementing pixels to a side, distal from the center, of a first edge in the initial image, wherein a grayscale value of each of the first supplementing pixels is equal to a grayscale value of a third pixel, which is disposed in a same column as the first supplementing pixel, in the first edge;

adding a plurality of second supplementing pixels to a side, distal from the center, of a second edge in the initial image, wherein a grayscale value of each of the second supplementing pixels is equal to a grayscale value of a fourth pixel, which is disposed in a same column as the second supplementing pixel, in the second edge;

adding a plurality of third supplementing pixels to a side, distal from the center, of a third edge in the initial image, wherein a grayscale value of each of the third supplementing pixels is equal to a grayscale value of a fifth pixel, which is disposed in a same row as the third supplementing pixel, in the third edge; and adding a plurality of fourth supplementing pixels to a side, distal from the center, of a fourth edge in the initial image, wherein a grayscale value of each of the fourth supplementing pixels is equal to a grayscale value of a sixth pixel, which is disposed in a same row as the fourth supplementing pixel, in the fourth edge, wherein both the first edge and the second edge are parallel to a pixel row direction, and both the third edge and the fourth edge are parallel to a pixel column direction.

13. The method according to claim 1, wherein a size of the first display panel is greater than a size of the second display panel, and a number of pixels in the second display panel is an integer multiple of a number of pixels in the first display panel; and after driving the second display panel to perform display based on the second display image, the method further comprises:
   determining positions of effective pixels of the first display panel, wherein an orthographic projection of the effective pixel on the second display panel is disposed within the second display panel;
   determining grayscale values of respective pixels in a third display image based on a size relationship of a first size of the pixel in the first display panel and a second size of the pixel in the second display panel, and the grayscale values of the respective pixels in the second display image;
   acquiring a fourth display image by performing second edge supplementing processing on the third display image based on the positions of the effective pixels of the first display panel, wherein the second edge supplementing processing is pixel filling processing for a region with an edge distal from the center in the third display image; and
   displaying the fourth display image in the first display panel.

14. The method according to claim 13, wherein performing second edge supplementing processing on the third display image based on the positions of the effective pixels of the first display panel comprises:
   adding a plurality of fifth supplementing pixels to a side, distal from the center, of at least one row edge in the third display image based on the positions of the effective pixels of the first display panel, wherein a grayscale value of each of the fifth supplementing pixels is equal to a grayscale value of a seventh pixel, which is closest to the fifth supplementing pixel and disposed in a same column as the fifth supplementing pixel in the third display image; and
   adding a plurality of sixth supplementing pixels to a side, distal from the center, of at least one column edge in the third display image based on the positions of the effective pixels of the first display panel, wherein a grayscale value of each of the sixth supplementing pixels is equal to a grayscale value of an eighth pixel, which is closest to the sixth supplementing pixel and disposed in a same row as the sixth supplementing pixel in the third display image.

15. The method according to claim 14, wherein grayscale values of pixels in an $(i+m)^{th}$ row in the third display image satisfy:

$$sub1(i+m, :) = a1 * \text{mean}\left(\text{main}\left(\frac{i-x1}{n1}*n2+c*m-(m-1):\frac{i-x1}{n1}*n2+c*(m+1)-m, :\right)\right) + b1 *$$
$$\max\left(\text{main}\left(\frac{i-x1}{n1}*n2+c*m-(m-1):\frac{i-x1}{n1}*n2+c*(m+1)-m, :\right)\right);$$

and
grayscale values of pixels in the $(j+m)^{th}$ column in the third display image satisfy:

$$sub2(:, j+m) = a1 * \text{mean}$$
$$\left(\text{main}\left(:, \frac{j-y1}{n1}*n2+c*m-(m-1):\frac{j-y1}{n1}*n2+c*(m+1)-m\right)\right) + b1 *$$
$$\max\left(\text{main}\left(:, \frac{j-y1}{n1}*n2+c*m-(m-1):\frac{j-y1}{n1}*n2+c*(m+1)-m\right)\right),$$

wherein the size relationship satisfies: a total size n1*d1 of n1 pixels in the first display panel is equal to a total size n2*d2 of n2 pixels in the second display panel, d1 is the first size of each pixel in the first display panel, and d2 is the second size of each pixel in the second display panel; i ranges from x1 to x2, a ratio of i−x1 to n1 is an integer, j ranges from y1 to y2, and a ratio of j−y1 to n1 is an integer; x1 is a row number of a first row of pixels in the effective pixels in the first display panel, x2 is a row number of a last row of pixels in the effective pixels in the first display panel, y1 is a column number of a first column of pixels in the effective pixels in the first display panel, and y2 is a column number of a last column of pixels in the effective pixels in the first display panel; a1 is a weight coefficient of an average grayscale value, and b1 is a weight coefficient of a maximum grayscale value; and mean( ) is configured to represent the average grayscale value, max( ) is configured to represent the maximum grayscale value, and c is configured to indicate that a grayscale value of one pixel in the third display image is determined by grayscale values of c pixels in the second display image.

16. The method according to claim 13, wherein the plurality of first display panel regions of the first display panel include a plurality of third panel regions which are in one-to-one correspondence with the plurality of backlight sections; the plurality of second display panel regions of the second display panel include a plurality of fourth panel regions which are in one-to-one correspondence with the plurality of backlight sections; and
   determining the positions of the effective pixels of the first display panel comprises:
   acquiring a test image;
   determining a target third panel region in the plurality of third panel regions and a target fourth panel region in the plurality of fourth panel regions based on brightness of respective pixels in the test image displayed by the display device, wherein an alignment accuracy between the target third panel region and the target fourth panel region is greater than an alignment accuracy between another third panel region and the corresponding fourth panel region; and
   determining the positions of the effective pixels of the first display panel based on a position of the target third panel region on the first display panel, the size of the first display panel, and the size of the second display panel.

17. The method according to claim 16, wherein the test image comprises a plurality of test patterns; and
   the brightness of the test patterns displayed in the target third panel region and the target fourth panel region is higher than the brightness of the test patterns displayed in the other panel regions.

18. An apparatus for displaying an image, applicable to a display device, wherein the display device comprises a backlight module, a first display panel, and a second display panel that are laminated sequentially, wherein the backlight module comprises a plurality of backlight sections arranged in an array and a plurality of backlight sources, each of the backlight sections being provided with at least one of the backlight sources, and wherein the first display panel comprises a black-and-white display panel of a first resolution, and the second display panel comprises a color display panel of a second resolution, the first resolution being less than the second resolution; and the apparatus for displaying an image comprises a processor and a memory storing at least one computer program therein, wherein the processor, when executing the computer program stored in the memory, is caused to perform:

acquiring a first target image with a third resolution and a second target image with a fourth resolution based on a source image and acquiring grayscale values of respective pixels in the first target image and grayscale values of respective pixels in the second target image, wherein both the third resolution and the fourth resolution are less than the second resolution and the first target image comprises a plurality of first image regions in one-to-one correspondence with a plurality of backlight sections;

determining a reference grayscale value of each of the backlight sections based on the grayscale values of respective pixels in the first image region corresponding to the backlight section;

determining grayscale values of respective pixels in a first display image based on the grayscale values of respective pixels in the first target image, wherein a resolution of the first display image is the first resolution;

determining grayscale values of respective pixels in a second display image based on the grayscale values of the respective pixels in the first target image, the grayscale values of respective pixels in the second target image, the reference grayscale values of the plurality of backlight sections, and the grayscale values of the respective pixels in the first display image;

driving each of the backlight sources to emit light based on the reference grayscale value of the backlight section where the backlight source is disposed;

driving the first display panel to perform display based on the grayscale values of respective pixels in the first display image; and driving the second display panel to perform display based on the grayscale values of respective pixels in the second display image.

19. A display device, comprising the apparatus for displaying the image as defined in claim 18, and a backlight module, a first display panel, and a second display panel that are laminated sequentially, wherein the backlight module comprises a plurality of backlight sections arranged in an array and a plurality of backlight sources, each of the backlight sections being provided with at least one of the backlight sources; and the first display panel comprises a black-and-white display panel of a first resolution, and the second display panel comprises a color display panel of a second resolution, the first resolution being less than the second resolution.

\* \* \* \* \*